US010509572B2

(12) United States Patent
Sugimori et al.

(10) Patent No.: US 10,509,572 B2
(45) Date of Patent: Dec. 17, 2019

(54) STORAGE DEVICE THAT CARRIES OUT PARALLEL OPERATIONS IN RESPONSE TO HOST COMMANDS AND UPON DETECTION OF AN ERROR CONDITION IN ONE OPERATION, CONTINUES THE OTHER OPERATION BEFORE NOTIFICATION OF THE ERROR CONDITION IS TRANSMITTED TO THE HOST

(71) Applicant: Toshiba Memory Corporation, Tokyo (JP)

(72) Inventors: Yutaka Sugimori, Chigasaki Kanagawa (JP); Takamasa Hirata, Kodaira Tokyo (JP); Mitsuhiko Sugiyama, Yokosuka Kanagawa (JP); Masaaki Tamura, Chigasaki Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 122 days.

(21) Appl. No.: 15/450,667

(22) Filed: Mar. 6, 2017

(65) Prior Publication Data
US 2017/0262205 A1 Sep. 14, 2017

(30) Foreign Application Priority Data
Mar. 8, 2016 (JP) .................................. 2016-044846

(51) Int. Cl.
*G06F 3/06* (2006.01)
*G06F 11/30* (2006.01)
(Continued)

(52) U.S. Cl.
CPC .......... *G06F 3/0619* (2013.01); *G06F 3/0659* (2013.01); *G06F 3/0679* (2013.01);
(Continued)

(58) Field of Classification Search
CPC .. G06F 3/0619; G06F 11/327; G06F 11/3051; G06F 3/0679; G06F 3/0659; G06F 11/3034
(Continued)

(56) References Cited

U.S. PATENT DOCUMENTS 6,286,056 B1 9/2001 Edgar et al.
8,943,226 B1 1/2015 Hoglund et al.
(Continued)

OTHER PUBLICATIONS

Working Draft American National Standard, Project T10/BSR INCITS 546, Information technology—SCSI Archticture Model—6 (SAM-6), Revision 02, May 11, 2016, 210 pages.
(Continued)

*Primary Examiner* — Hong C Kim
(74) *Attorney, Agent, or Firm* — Kim & Stewart LLP

(57) ABSTRACT

A storage device includes a non-volatile storage, and a controller configured to carry out, in parallel, operations in response to a plurality of commands received from a host and queued in a command queue. When the controller detects an error in a first operation that is being carried out in response to a first command while the controller is in parallel carrying out a second operation in response to a second command, the controller continues to carry out the second operation until a predetermined condition is met while carrying out the second operation and, at that time when the predetermined condition is met, transmits an error event notification to the host.

18 Claims, 29 Drawing Sheets

(51) Int. Cl.
*G06F 11/32* (2006.01)
*G06F 11/07* (2006.01)

(52) U.S. Cl.
CPC ...... *G06F 11/0727* (2013.01); *G06F 11/3034* (2013.01); *G06F 11/3051* (2013.01); *G06F 11/327* (2013.01)

(58) Field of Classification Search
USPC ............................ 710/5, 52; 711/154, 103
See application file for complete search history.

(56) References Cited

U.S. PATENT DOCUMENTS

| | | | |
|---|---|---|---|
| 2009/0296253 A1* | 12/2009 | Karakawa | G11B 5/455 360/31 |
| 2011/0179214 A1 | 7/2011 | Goggin et al. | |
| 2012/0137051 A1* | 5/2012 | Masuo | G06F 13/16 711/103 |
| 2012/0159016 A1* | 6/2012 | Morita | G06F 13/1673 710/33 |
| 2014/0310431 A1* | 10/2014 | Asnaashari | G06F 13/161 710/6 |
| 2016/0056880 A1* | 2/2016 | Yamasaki | H04B 7/15 370/315 |

OTHER PUBLICATIONS

Working Draft American National Standard, Project T10/BSR INCITS 538, Information technology—SAS Protocol Layer—4 (SPL-4), Revision 11, Jan. 12, 2017, 1052 pages.

\* cited by examiner

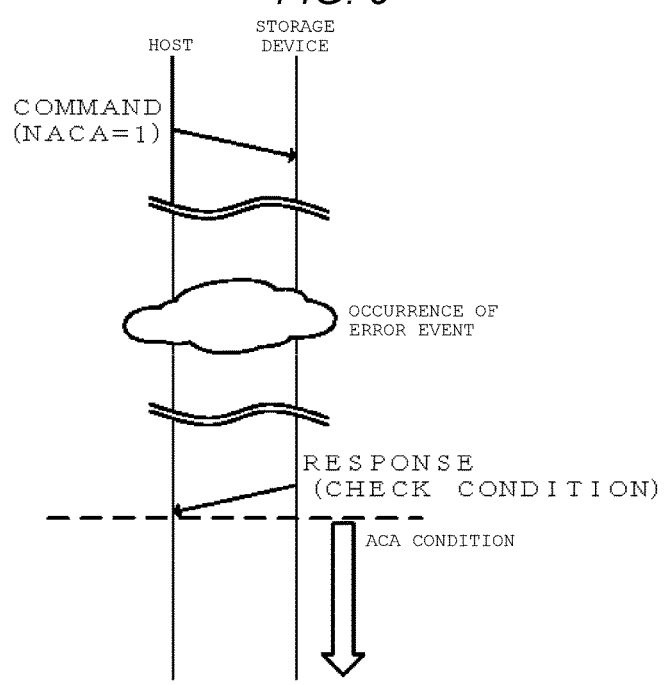

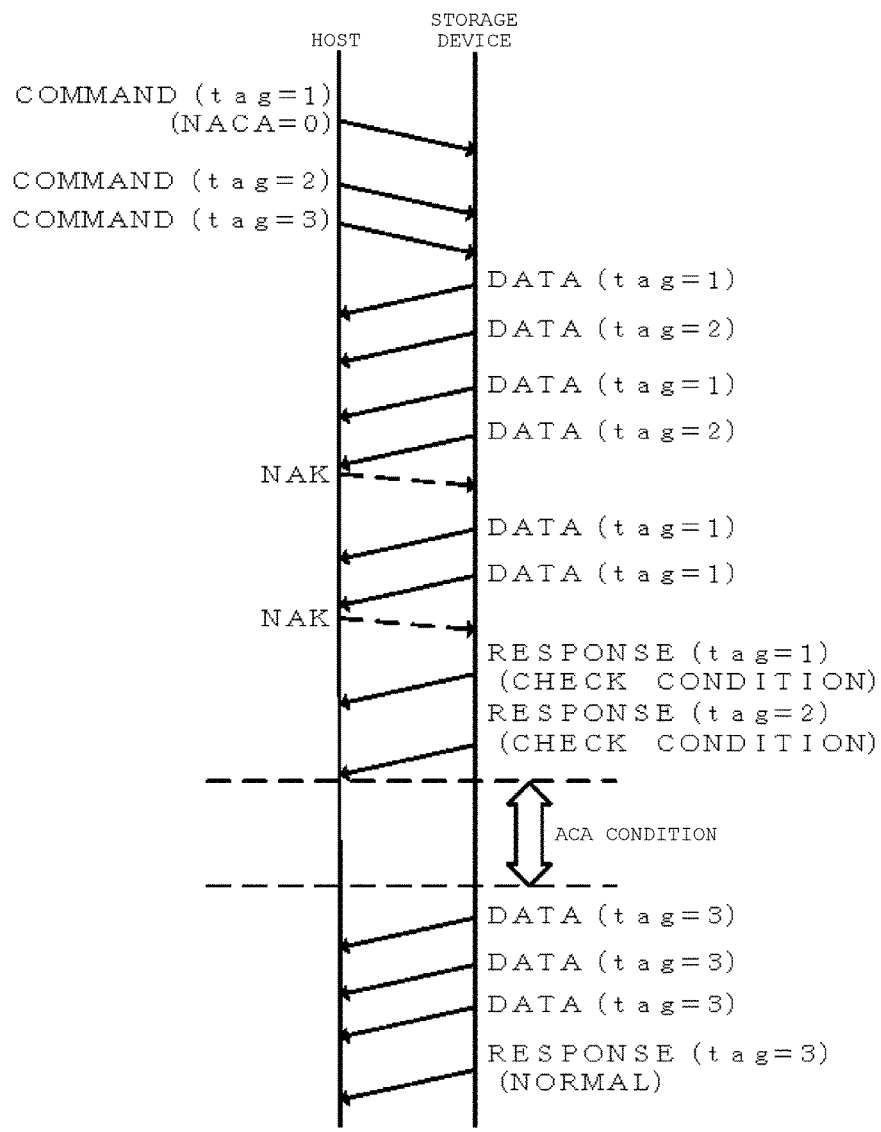

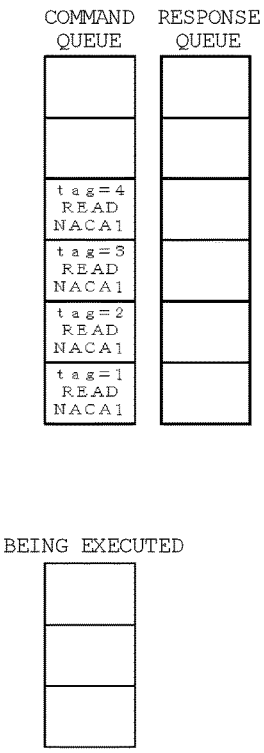
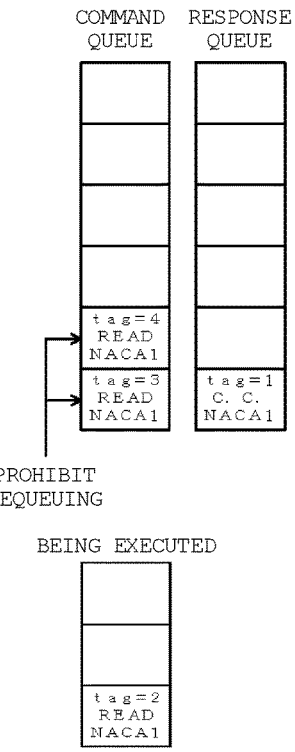
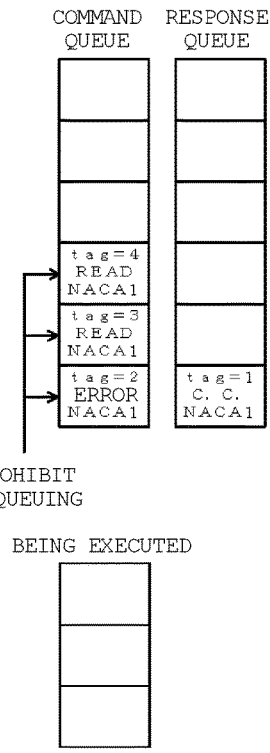
FIG. 15A  FIG. 15B  FIG. 15C
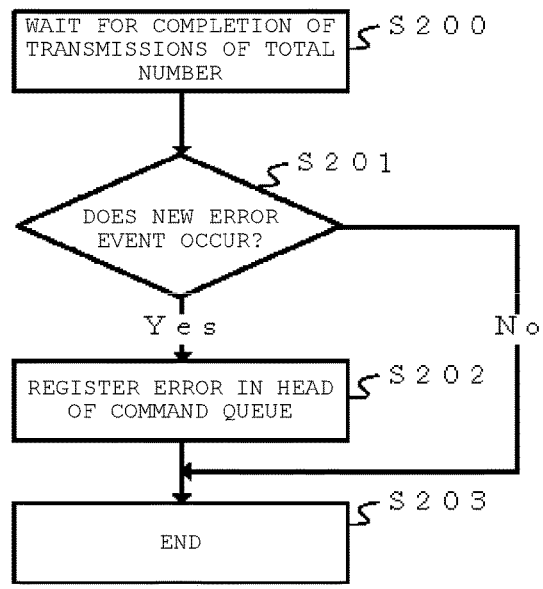
FIG. 16

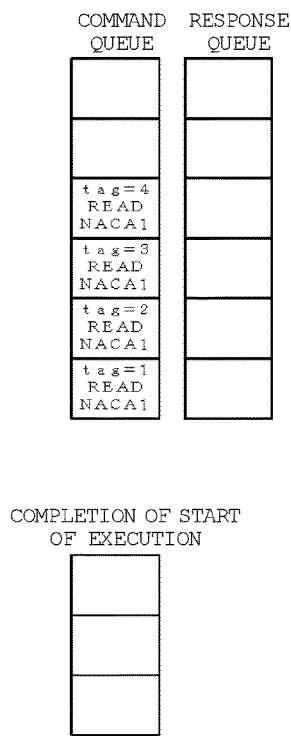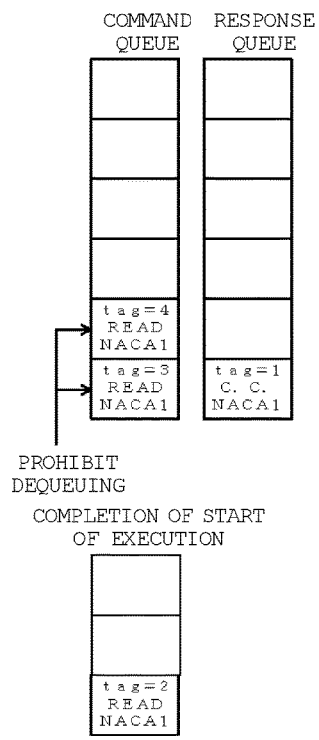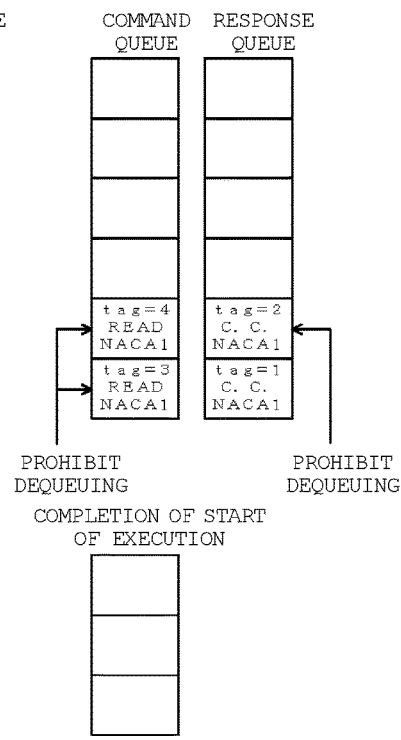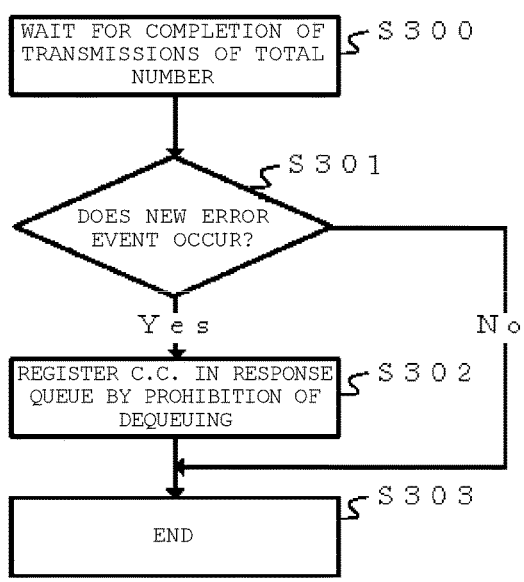

FIG. 26
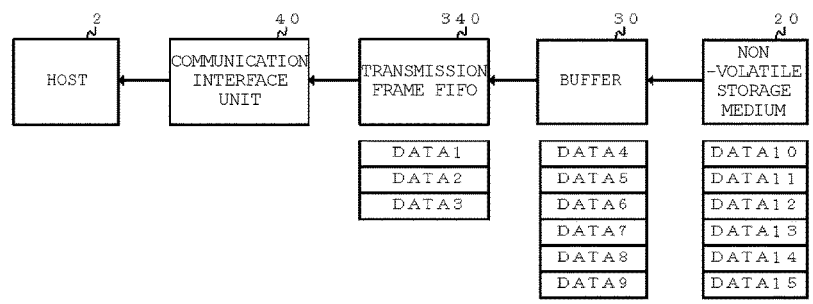
FIG. 27A
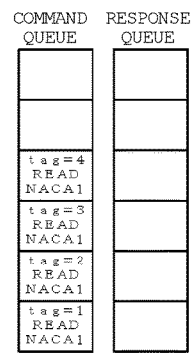
BEING EXECUTED
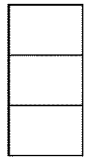
FIG. 27B
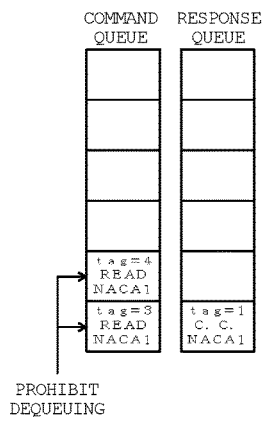
BEING EXECUTED
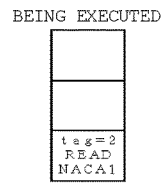
FIG. 27C
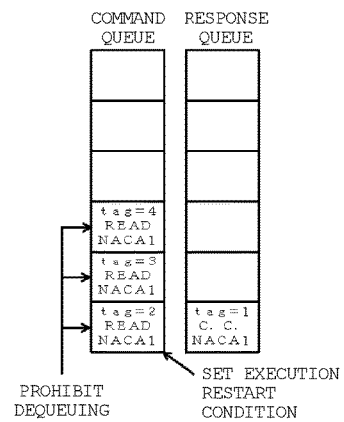
BEING EXECUTED
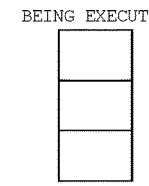

FIG. 31A

| REMAINING NUMBER OF TRANSMISSIONS | EXECUTION STEP |
|---|---|
| REMAINING NUMBER OF TRANSMISSIONS ≥ FIRST THRESHOLD VALUE | (R1) TRANSMISSION OF READ DATA READ OUT FROM BUFFER IS COMPLETED. |
| FIRST THRESHOLD VALUE > REMAINING NUMBER OF TRANSMISSIONS ≥ SECOND THRESHOLD VALUE | (R2) TRANSMISSION OF PORTION OR ENTIRETY OF READ DATA STORED IN BUFFER AND/OR PORTION OF READ DATA WHICH ARE NEWLY READ OUT FROM NON-VOLATILE STORAGE MEDIUM IS COMPLETED. |
| REMAINING NUMBER OF TRANSMISSIONS < SECOND THRESHOLD VALUE | (R3) TRANSMISSION OF ALL READ DATA DESIGNATED BY READ COMMAND IS COMPLETED. |

FIG. 31B

| REMAINING NUMBER OF TRANSMISSIONS | EXECUTION STEP |
|---|---|
| REMAINING NUMBER OF TRANSMISSIONS ≥ THIRD THRESHOLD VALUE | (W1) (W2) RECEPTION OF WRITE DATA REQUESTED IN XFER_RDY FRAME IS COMPLETED. |
| THIRD THRESHOLD VALUE > REMAINING NUMBER OF TRANSMISSIONS | (W3) (W4) RECEPTION OF ALL WRITE DATA DESIGNATED BY READ COMMAND IS COMPLETED. |

STORAGE DEVICE THAT CARRIES OUT PARALLEL OPERATIONS IN RESPONSE TO HOST COMMANDS AND UPON DETECTION OF AN ERROR CONDITION IN ONE OPERATION, CONTINUES THE OTHER OPERATION BEFORE NOTIFICATION OF THE ERROR CONDITION IS TRANSMITTED TO THE HOST

CROSS-REFERENCE TO RELATED APPLICATION

This application is based upon and claims the benefit of priority from Japanese Patent Application No. 2016-044846, filed Mar. 8, 2016, the entire contents of which are incorporated herein by reference.

FIELD

Embodiments described herein relate generally to a storage device.

BACKGROUND

An error processing procedure of a storage device is likely to become complicated.

DESCRIPTION OF THE DRAWINGS

FIG. 9 illustrates an operation in an ACA condition specified by an SCSI standard.

FIG. 14 illustrates another operation carried out when an error occurs in accordance with a command being executed in the storage device according to the first embodiment.

FIGS. 15A to 15C show first operations of a command queue and a response queue when the storage device according to the first embodiment processes an error event.

FIG. 16 is a flowchart showing a first operation carried out when the storage device according to the first embodiment processes an error event.

FIGS. 17A to 17C show second operations of a command queue and a response queue carried out when the storage device according to the first embodiment processes an error event.

FIG. 18 is a flowchart showing a second operation carried out when the storage device according to the first embodiment processes an error event.

FIG. 26 illustrates the state of read data in accordance with a read command being executed in a storage device according to a second embodiment.

FIGS. 27A to 27C show operations of a command queue and a response queue when the storage device according to the second embodiment processes an error event.

FIGS. 31A and 31B show change conditions of an execution step in a storage device according to a fourth embodiment.

DETAILED DESCRIPTION

Figure 1:
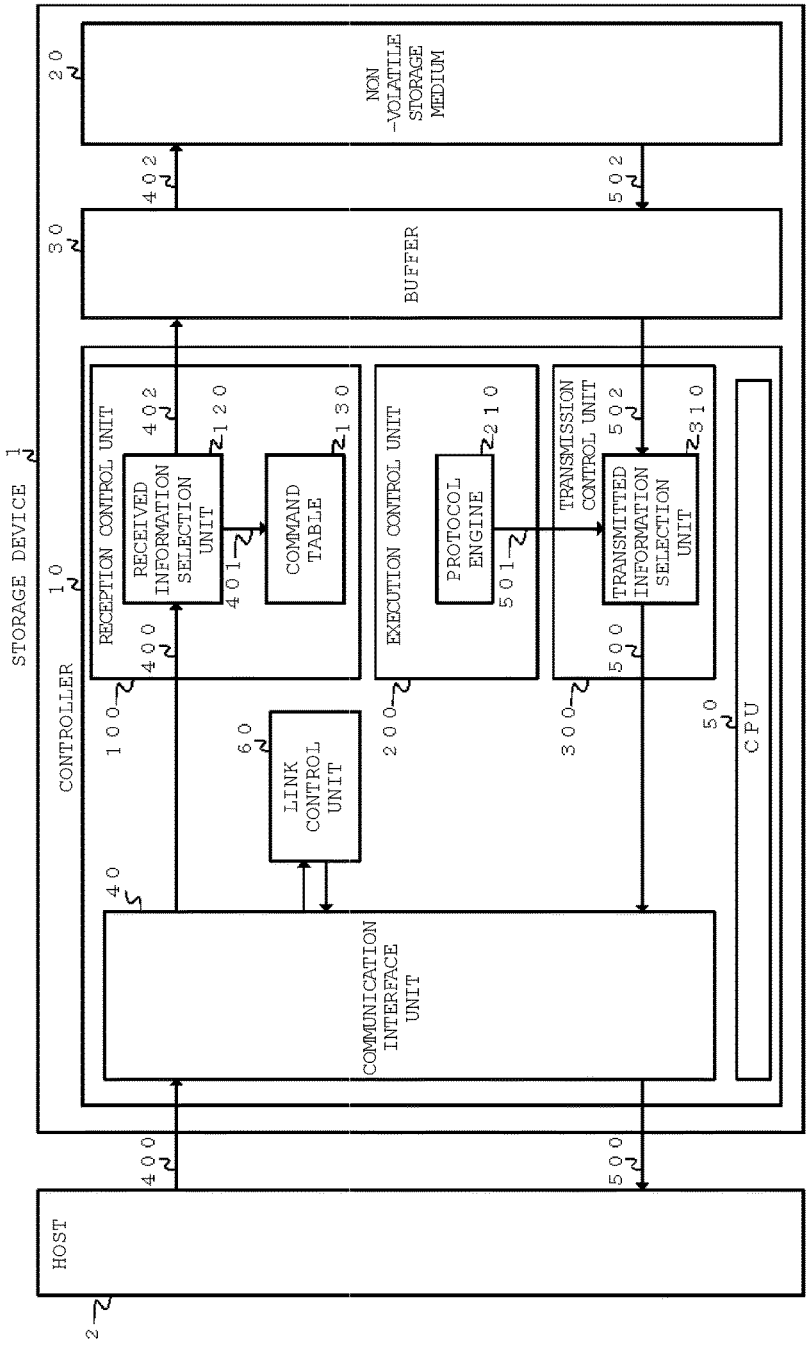
FIG. 1 is a block diagram of a storage device according to a first embodiment.

An embodiment provides a storage device in which an error processing procedure is simplified.

In general, according to an embodiment, there is provided a storage device including a non-volatile storage, and a controller configured to carry out, in parallel, operations in response to a plurality of commands received from a host and queued in a command queue. When the controller detects an error in a first operation that is being carried out in response to a first command while the controller is in parallel carrying out a second operation in response to a second command, the controller continues to carry out the second operation until a predetermined condition is met while carrying out the second operation and, at that time when the predetermined condition is met, transmits an error event notification to the host.

Hereinafter, a storage device according to embodiments will be described with reference to the accompanying drawings. In the following description, components having the same function and configuration will be denoted with common reference numerals and signs.

First Embodiment

FIG. 1 is a block diagram of a storage device according to a first embodiment.

A storage device 1 includes a controller 10 that controls the overall storage device 1, a non-volatile storage medium 20 that stores data, a buffer 30 that temporarily stores data communicated between a host 2 and the non-volatile storage medium 20, and the like.

In the present embodiment, the host 2 is a computer that supports an interface of a serial attached scsi (SAS) standard, but may be a computer that supports interfaces of other standards, for example, a Ultra SCSI standard, a fibre channel (FC) standard, a serial ATA (SATA) standard, a peripheral component interconnect express (PCIe) standard, and a NVM express (NVMe) standard.

The controller 10 is a semiconductor integrated circuit which is designed as, for example, a system on a chip (SoC).

For example, a NAND-type flash memory, a magnetic disk, or the like is used as the non-volatile storage medium 20.

In the present embodiment, the buffer 30 is a memory including a static random access memory (SRAM), but other types of memories such as a dynamic random access memory (DRAM) may be used as the buffer. In addition, the buffer 30 may be built into the controller 10.

The controller 10 includes a communication interface unit 40 that communicates with the host 2, a central processing unit (CPU) 50 that executes firmware (FW) to control the overall storage device 1, a link control unit 60 that performs control of a link layer such as management of connection to the host 2 and transmission and reception of a primitive, a reception control unit 100 that controls reception of information received from the host 2, an execution control unit 200 that controls execution of a command received from the host 2, a transmission control unit 300 that controls transmission of information to the host 2, and the like. The CPU 50 may not be necessarily built into the controller 10.

The reception control unit 100 includes a received information selection unit 120 that distributes a command and data received from the host 2, a command table 130 that stores a received command, and the like.

The execution control unit 200 includes a protocol engine 210 that executes a command using a protocol suitable for an interface, and the like.

The transmission control unit 300 includes a transmitted information selection unit 310 that distributes status information and data which are transmitted to the host 2, and the like.

The storage device 1 can also selectively communicate with any one of a plurality of hosts 2 through a repeater, which is also called an expander.

In addition, some or all of the functions performed by executing the FW in the following description can also be executed by dedicated hardware (HW), and some or all of the functions performed by the HW can also be performed by executing the FW.

Figure 2:
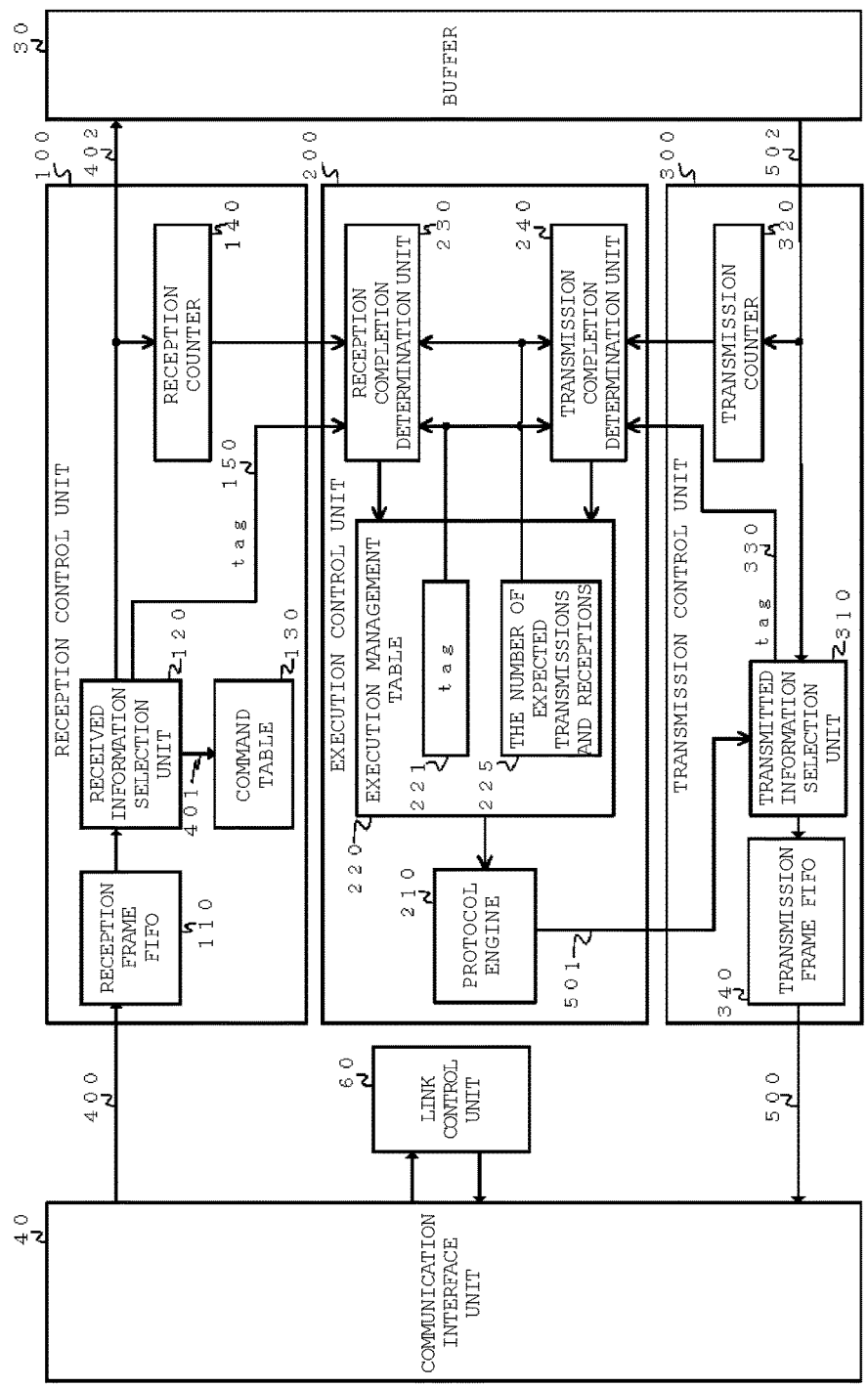
FIG. 2 is a block diagram of a reception control unit, an execution control unit, and a transmission control unit in the storage device according to the first embodiment.

FIG. 2 is a block diagram of the reception control unit 100, the execution control unit 200, and the transmission control unit 300 of the storage device 1 according to the first embodiment.

A reception frame FIFO 110 in the reception control unit 100 is an FIFO for temporarily storing information 400 received in the format of a frame from the host 2. In the present embodiment, the reception frame FIFO 110 has a capacity corresponding to three frames. The received information selection unit 120 selects a storage destination based on a frame classification field in a frame header and stores the information 400, which is taken out from the reception frame FIFO 110. That is, a COMMAND frame 401, which is command information, is stored in the command table 130, and a DATA frame 402, which is data to be stored in the non-volatile storage medium 20, is stored in the buffer 30.

The COMMAND frame 401 stored in the command table 130 is taken out by executing the FW, and the FW is executed to analyze the type of command (that is, the type of write command, read command, or non-data command), a logical block address (LBA), the number of transmissions, and the like.

In addition, the reception control unit 100 includes a reception counter 140 which counts the length (the number of pieces of data) of the DATA frame 402 stored in the buffer 30. The value of the reception counter 140 is output to the execution control unit 200.

The transmitted information selection unit 310 in the transmission control unit 300 selects status information 501 indicating an internal state of the storage device 1 and a DATA frame 502, which is data read from the non-volatile storage medium 20 and stored in the buffer 30 under the instruction of the execution control unit 200, and outputs the selected status information and the DATA frame to the communication interface unit 40 through a transmission frame FIFO 340. The transmission frame FIFO 340 has a capacity corresponding to three frames in the present embodiment.

The status information 501 includes a RESPONSE frame for giving a notice of the completion of the command, and a transfer ready (XFER_RDY) frame for giving a notice that write data are ready to be received.

In addition, the transmission control unit 300 includes a transmission counter 320 which counts the length (the number of pieces of data) of the DATA frame 502 read out from the buffer 30. The value of the transmission counter 320 is output to the execution control unit 200.

The execution control unit 200 includes an execution management table 220, a reception completion determination unit 230, and a transmission completion determination unit 240, in addition to the protocol engine 210.

Figure 3:
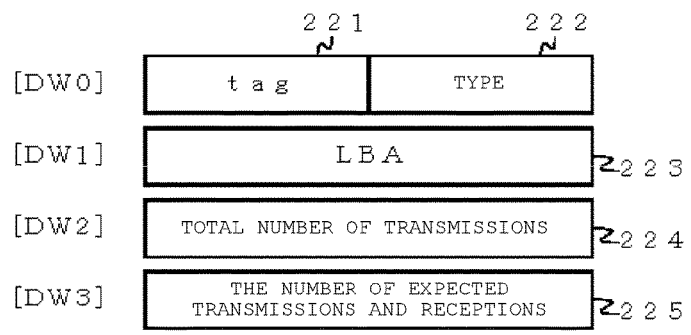
FIG. 3 illustrates a configuration of an execution management table in the storage device according to the first embodiment.

The execution management table 220 manages queuing of a command, and an example of the configuration thereof is shown in FIG. 3. In the execution management table 220, for example, one entry includes 4DW (double word, 1DW is 32 bits). The number of entries in the table is determined in accordance with the number of commands which are simultaneously queued. For example, in a case where eight commands are required to be simultaneously queued, eight entries are prepared in the execution management table 220.

A tag 221 which is added to a frame header in order to identify each command to be queued, a type 222 of command, an LBA 223, a total number of transmissions 224 which is designated by the command, and the number of expected transmissions and receptions 225 of data which are currently transmitted and received are set in entries of the execution management table 220. The number of expected transmissions and receptions 225 is treated as the number of expected transmissions during the execution of a read command and is treated as the number of expected receptions during the execution of a write command. Although the number of expected transmission and receptions 225 may conform to the total number of transmissions 224 which is designated by the command, a number based on data stored in the buffer 30 may be set as the number of expected transmissions, and a number based on an empty space of the buffer 30 may be set as the number of expected receptions.

Referring back to FIG. 2, the reception completion determination unit 230 receives inputs of a tag 150 of the DATA frame 402 which is currently received and the value of the reception counter 140 from the reception control unit 100, and receives inputs of the tag 221 and the number of expected receptions 225 from each entry of the execution management table 220. When the received tag 150 of the DATA frame 402 conforms to the tag 221 which is set in the execution management table 220 and the value of the number of expected receptions 225 of the entry conforms to the value of the reception counter 140, the reception completion determination unit 230 notifies the execution management table 220 that write data of the entry have been received.

Similarly, the transmission completion determination unit 240 receives inputs of a tag 330 of the DATA frame 502 which is currently transmitted and the value of the transmission counter 320 from the transmission control unit 300, and receives inputs of the tag 221 and the number of expected transmissions 225 from each entry of the execution management table 220. When the tag 330 of the DATA frame 502 conforms to the tag 221 set in the execution management table 220 and the value of the number of expected transmissions 225 of the entry conforms to the value of the transmission counter 320, the transmission completion determination unit 240 notifies the execution management table 220 that read data of the entry have been transmitted.

Figure 4A:
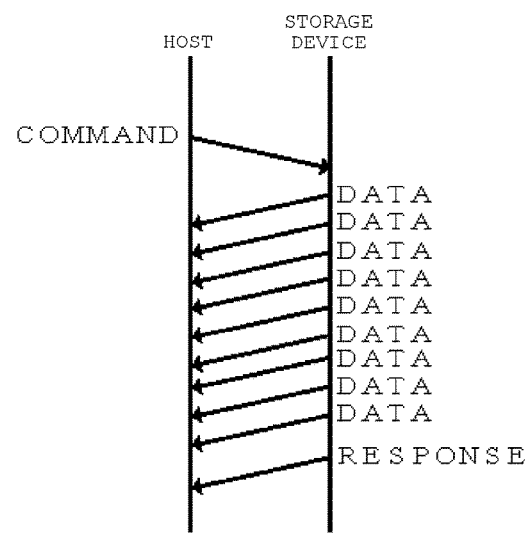
FIG. 4A illustrates a protocol of a read command executed by the storage device according to the first embodiment.
Figure 4B:
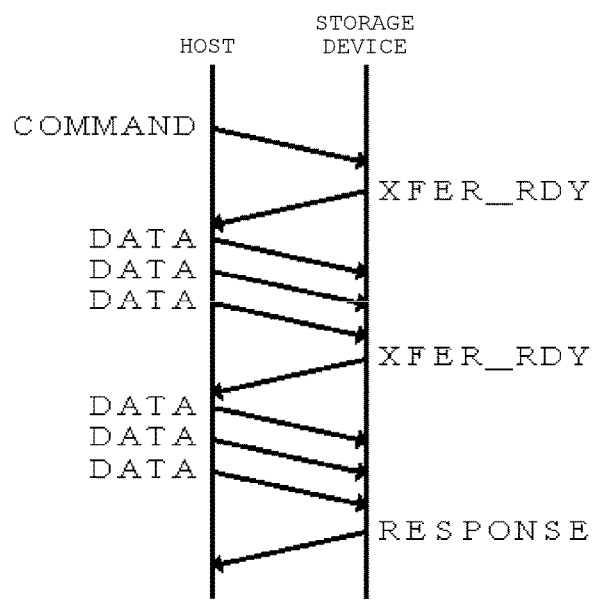
FIG. 4B illustrates a protocol of a write command executed by the storage device according to the first embodiment.
Figure 4C:
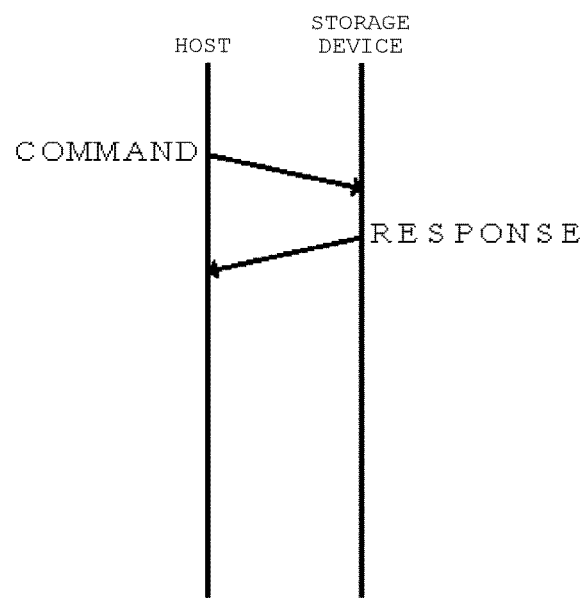
FIG. 4C illustrates a protocol of a non-data command executed by the storage device according to the first embodiment.

Next, a protocol of a command controlled by the execution control unit 200 will be described with reference to FIGS. 4A to 4C. In FIGS. 4A to 4C, control of a link layer which is performed by the link control unit 60 is omitted in order to simplify description.

FIG. 4A shows a protocol of a read command.

A COMMAND frame transmitted by the host 2 is stored in the command table 130. After the FW is executed to take out the COMMAND frame, store data read out from the non-volatile storage medium 20 in the buffer 30, and perform other necessary processes, the tag 221, a read command as the type 222 of command, the LBA 223, the total number of transmissions 224 designated by the read command, and the number of expected transmissions 225 are set in the execution management table 220. Then, the execution management table 220 requests generation of a DATA frame from the protocol engine 210. The protocol engine 210 having received the request acquires the tag 221 and the number of expected transmissions 225 from the execution management table 220 and acquires data from the buffer 30 to generate the DATA frame. The DATA frame is transmitted to the host 2 through the transmission frame FIFO 340 and the communication interface unit 40 from the transmitted information selection unit 310 of the transmission control unit 300.

When the storage device 1 transmits the DATA frame to the host 2 and the value of the number of expected transmissions 225 conforms to the value of the transmission counter 320, the transmission completion determination unit 240 notifies the execution management table 220 that read data have been transmitted.

The execution management table 220 having received the notice that the read data have been transmitted interrupts execution of the FW in a case where the transmission of DATA frames of a total number of transmissions designated by the read command has not been completed, and the FW is executed to perform the setting of the number of expected transmissions 225 and the like again. The execution management table 220 requests generation of a DATA frame from the protocol engine 210 again, and the DATA frame is transmitted again.

On the other hand, in a case where transmission of DATA frames of a total number of transmissions which is designated by the read command is completed, the execution management table 220 requests generation of a RESPONSE frame from the protocol engine 210. The protocol engine 210 acquires the tag 221 from the execution management table 220 to generate the RESPONSE frame.

The RESPONSE frame is transmitted to the host 2 through the transmission frame FIFO 340 and the communication interface unit 40 from the transmitted information selection unit 310 of the transmission control unit 300, and the host 2 can recognize the completion of the read command.

FIG. 4B shows a protocol of a write command.

The COMMAND frame transmitted by the host 2 is stored in the command table 130. After the FW is executed to take out the COMMAND frame, secure an empty space of the buffer 30, and perform other necessary processes, the tag 221, a write command as the type 222 of command, the LBA 223, the total number of transmissions 224 designated by the write command, and the number of expected receptions 225 are set in the execution management table 220. Then, the execution management table 220 requests generation of an XFER_RDY frame from the protocol engine 210. The protocol engine 210 having received the request acquires the tag 221 and the number of expected receptions 225 from the execution management table 220 to generate the XFER_RDY frame. The XFER_RDY frame is transmitted to the host 2 through the transmission frame FIFO 340 and the communication interface unit 40 from the transmitted information selection unit 310 of the transmission control unit 300.

The host 2 having received the XFER_RDY frame transmits a DATA frame. When the storage device 1 receives the DATA frame, the reception control unit 100 stores the DATA frame in the buffer 30. When the value of the number of expected receptions 225 conforms to the value of the reception counter 140, the reception completion determination unit 230 notifies the execution management table 220 that write data have been received.

The execution management table 220 having received the notice that the write data have been received interrupts execution of the FW in a case where the reception of DATA frames of a total number of transmissions designated by the write command has not been completed, and the FW is executed to perform setting of the number of expected receptions 225 and the like again. The execution management table 220 requests generation of an XFER_RDY frame from the protocol engine 210 again, and the XFER_RDY frame is transmitted again.

On the other hand, in a case where the reception of DATA frames corresponding to the total number of transmissions designated by the write command is completed, the execution management table 220 requests generation of a RESPONSE frame from the protocol engine 210. The protocol engine 210 acquires the tag 221 from the execution management table 220 to generate the RESPONSE frame.

The RESPONSE frame is transmitted to the host 2 through the transmission frame FIFO 340 and the communication interface unit 40 from the transmitted information selection unit 310 in the transmission control unit 300, and the host 2 can recognize completion of the write command.

Even when the transmission or reception of DATA frames of a total number of transmissions designated by the write command is completed, it is also possible to set the execution management table 220 not to request the generation of the RESPONSE frame from the protocol engine 210. In this case, after the transmission or reception of DATA frames is completed, the RESPONSE frame maybe transmitted in the same procedure as a non-data command to be described below.

FIG. 4C shows a protocol of a non-data command.

A COMMAND frame transmitted by the host 2 is stored in the command table 130. After the FW is executed to take out the COMMAND frame and performs a necessary process, non-data commands are set in the execution management table 220 as the tag 221 and the type 222 of command. In a case of the non-data command, the LBA 223, the total number of transmissions 224, and the number of expected transmissions and receptions 225 are not required to be set. Then, the execution management table 220 requests generation of a RESPONSE frame from the protocol engine 210. The protocol engine 210 having received the request acquires the tag 221 from the execution management table 220 to generate the RESPONSE frame.

The RESPONSE frame is transmitted to the host 2 through the transmission frame FIFO 340 and the communication interface unit 40 from the transmitted information selection unit 310 of the transmission control unit 300, and the host 2 can recognize completion of the non-data command.

Figure 5:
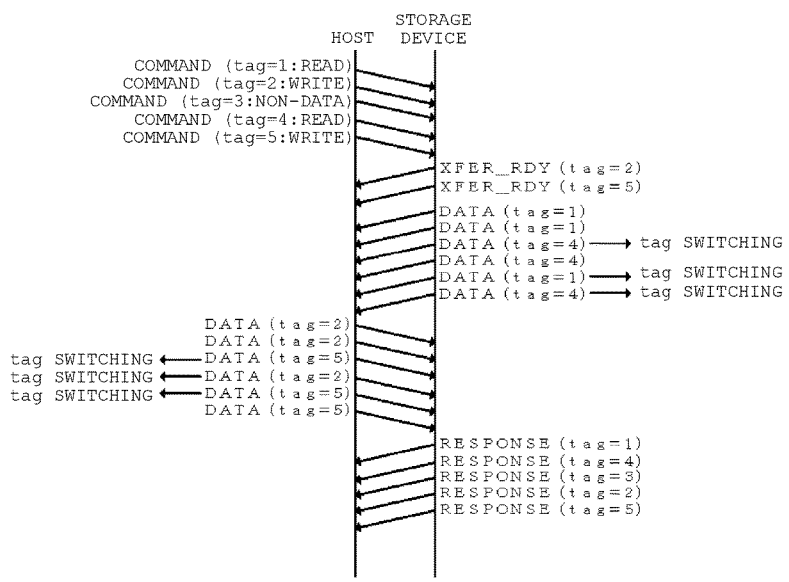
FIG. 5 illustrates queuing of a command in the storage device according to the first embodiment.

Next, an example of a protocol at the time of queuing a plurality of commands will be described with reference to FIG. 5.

The host 2 transmits five COMMAND frames, and issues a read command of tag=1, a write command of tag=2, a non-data command of tag=3, a read command of tag=4, and a write command of tag=5.

The storage device 1 secures an empty space of the buffer 30, and the like, and transmits an XFER_RDY frame of tag=2 and an XFER_RDY frame of tag=5.

In addition, the storage device 1 reads out data from the non-volatile storage medium 20, and transmits a DATA frame of tag=1 and a DATA frame of tag=4. At this time, DATA frames of a plurality of tags may be alternately transmitted depending on a read-out state of data from the non-volatile storage medium 20, as shown in FIG. 5.

On the other hand, the host 2 transmits a DATA frame of tag=2 and a DATA frame of tag=5. At this time, DATA frames of a plurality of tags may be alternately transmitted depending on the state of data transmission of the host 2, as shown in FIG. 5.

The storage device 1 transmits a RESPONSE frame with respect to tag=1 and tag=4 for which transmission of read data is completed, tag=3 for which processing requested by the command is completed, and tag=2 and tag=5 for which the reception of write data is completed.

At a timing (timing shown as "tag switching" in the drawing) when a tag is switched during the transmission of read data or the reception of write data, the value of the transmission counter 320 or the reception counter 140 may be copied, during transmission, to the number of expected transmissions and receptions 225 of the execution management table 220 in which corresponding tags are set.

Figure 6A:
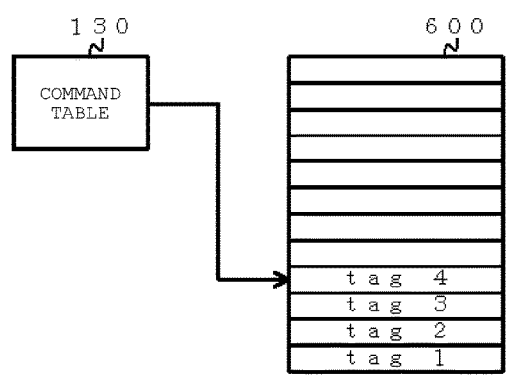
FIGS. 6A and 6B illustrate a configuration of a command queue in the storage device according to the first embodiment.
Figure 6B:
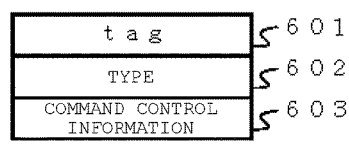

FIGS. 6A and 6B show a configuration of a command queue 600 which is managed by executing the FW in the storage device 1 according to the present embodiment.

The FW is executed to store a tag 601, a type 602 of command, and other necessary command control information 603 in a RAM, not shown in the drawings, within the CPU 50 after a COMMAND frame is taken out from the command table 130. The execution management table 220 is set based on these pieces of information, thereby executing a command.

Figure 7A:
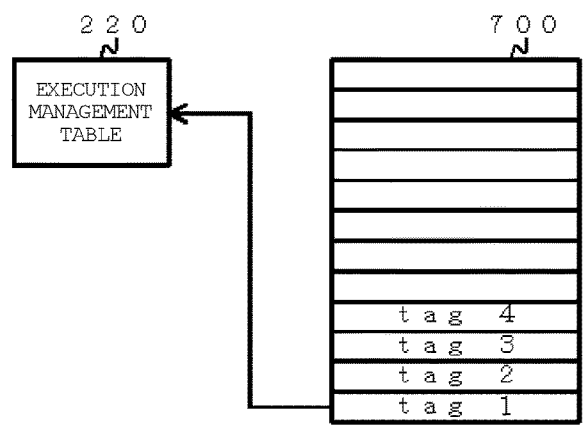
FIGS. 7A and 7B illustrate a configuration of a response queue in the storage device according to the first embodiment.
Figure 7B:
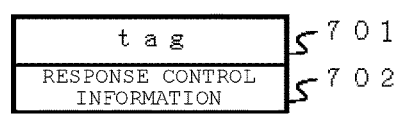

FIGS. 7A and 7B show a configuration of a response queue 700 which is managed by executing the FW in the storage device 1 according to the present embodiment.

The FW is executed to store a tag 701 of a command which is set to be in a state where a RESPONSE frame has to be transmitted, and other necessary response control information 702 in the RAM, not shown in the drawings, within the CPU 50. The execution management table 220 is set based on these pieces of information, thereby transmitting a RESPONSE frame.

In a case where data transmission is normally terminated and the execution management table 220 requests generation of a RESPONSE frame from the protocol engine 210 in a read command and a write command, the response queue 700 is not used.

In the above description, the command queue 600 and the response queue 700 are stored in the RAM of the CPU 50, but may be stored in a region of the buffer 30.

Figure 8:
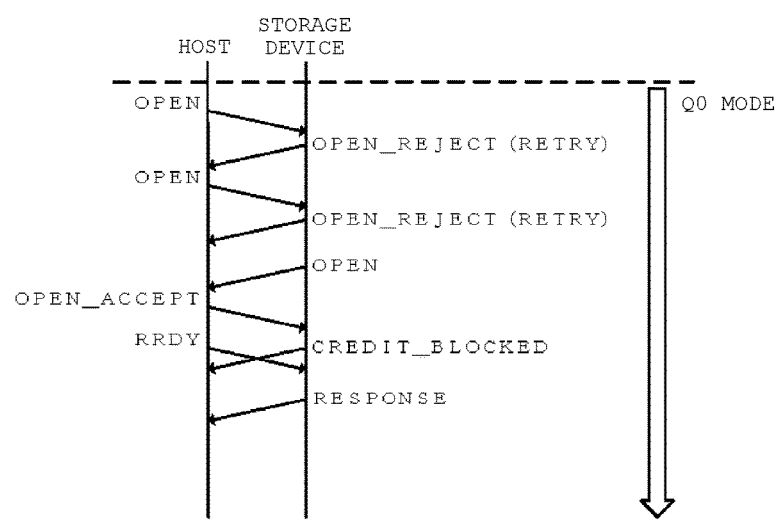
FIG. 8 illustrates an operation of a Q0 mode in the storage device according to the first embodiment.

FIG. 8 illustrates an operation in a Q0 mode which is one of command reception restriction modes of the storage device 1 according to the present embodiment. A control of a link layer which is performed by the link control unit 60, which is not described in FIGS. 4A to 4C, is described.

In an SAS interface, it is necessary to establish connection between the host 2 and the storage device 1 before a frame is transmitted. At this time, a side that requests connection transmits an OPEN address frame. On the other hand, a side receiving the OPEN address frame responds as an OPEN_ACCEPT primitive in a case of accepting the request, and responds as an OPEN_REJECT (RETRY) primitive in a case of rejecting the request. In a case of responding the OPEN_ACCEPT primitive, the number of frames capable of being received (at least one) has to be notified to a counterpart by a receiver ready (RRDY) primitive within 1 ms from the response. The side having transmitted the OPEN address frame does not have an obligation to transmit the RRDY primitive.

When the link control unit 60 in the present embodiment is set to be in the Q0 mode, the link control unit responds with the OPEN_REJECT (RETRY) primitive with respect to an OPEN address frame received from the host 2 as shown in FIG. 8. In a case of receiving the OPEN_ACCEPT primitive, the link control unit does not transmit a RRDY primitive and transmits a CREDIT_BLOCKED primitive in order to notify the host that a frame has not been received in the connection.

Although not shown in FIG. 8, the link control unit 60 immediately transmits a CREDIT_BLOCKED primitive and then executes a disconnection sequence of connection in a case where the link control unit is set to be in the Q0 mode when connection is already established.

Operation During Generation of ACA Condition

When the storage device 1 detects an error event generated by execution of a command and reports the error event to the host 2, the storage device 1 and the host 2 are set to be in an error processing condition. In the error processing condition, the host 2 performs abortion of the command, diagnosis of the storage device 1, and the like.

Examples of the error event include garbling of data in a transmission path between the host 2 and the storage device 1, an uncorrectable error during the read-out of data from the non-volatile storage medium 20, and the like.

Hereinafter, it is assumed that an auto contingent allegiance (ACA) condition specified by an SCSI standard including an SAS standard is the error processing condition. Even when the same error processing condition is specified by other standards, the error processing condition can be applied as long as the condition does not violate the specification of the standard.

FIG. 9 illustrates an operation at the time of generating an ACA condition which is specified by an SCSI standard.

The host 2 sets an NACA attribute in a command to the storage device 1 when issuing the command. In a case where an error event is generated during the execution of the command, the storage device 1 informs the host 2 of the error event, by reporting "CHECK CONDITION". In this manner, an ACA condition is generated by the report of "CHECK CONDITION" with respect to the command of NACA=1, various restrictions are thereafter applied for error processing performed by the host 2. Details thereof will be described below.

Since it is difficult to predict in advance for which command an error event occurs, the host 2 normally issues all read commands and write commands in NACA=1 in a case where the host 2 desires to use an ACA condition for the error processing. With respect to a command received before the generation of the ACA condition and held without being executed, the ACA condition is generated and has to be executed after the cancellation of the ACA condition.

Figure 10A:
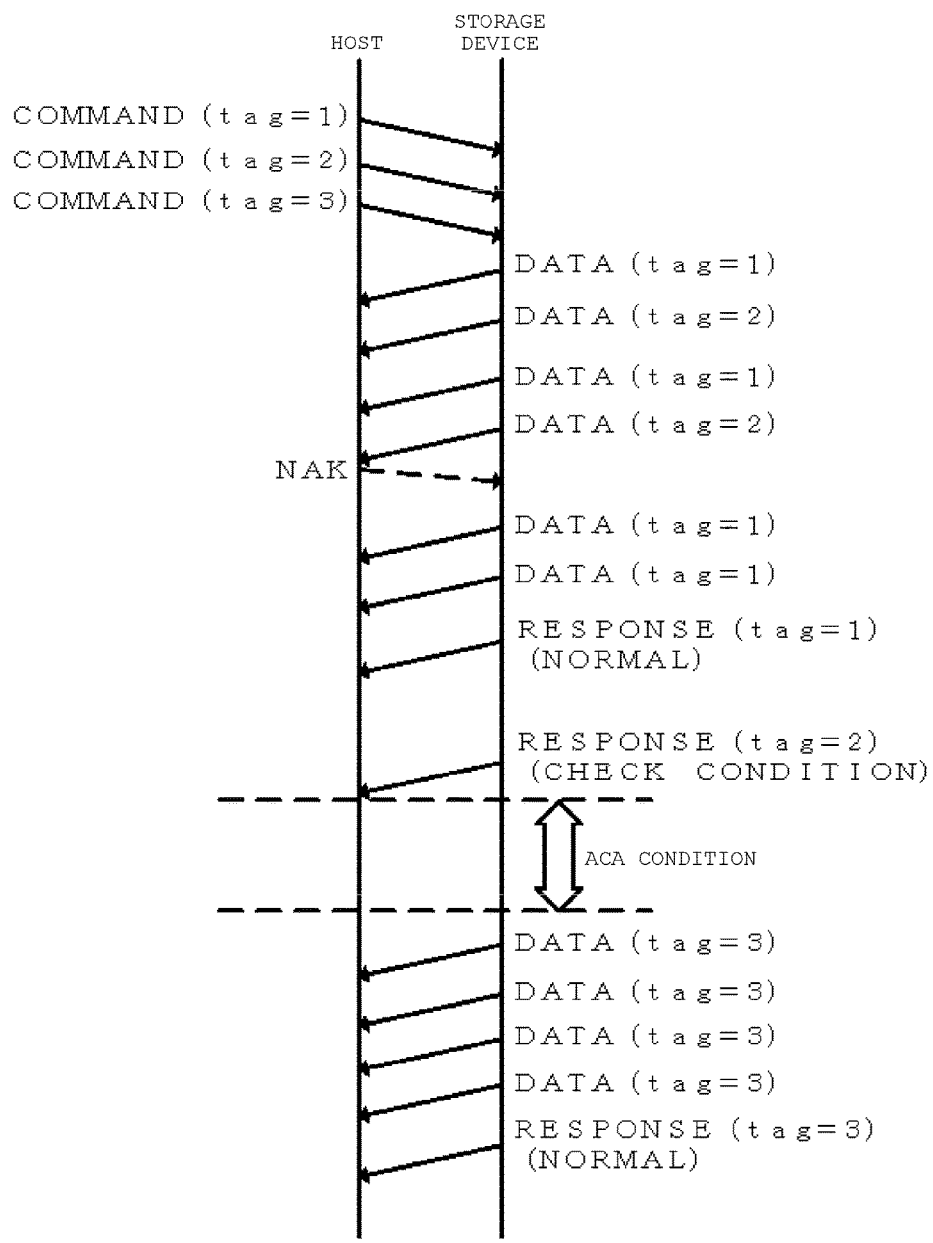
FIG. 10A illustrates a sequence of an operation from generation of an ACA condition by the storage device according to the first embodiment to cancellation thereof.
Figure 10B:
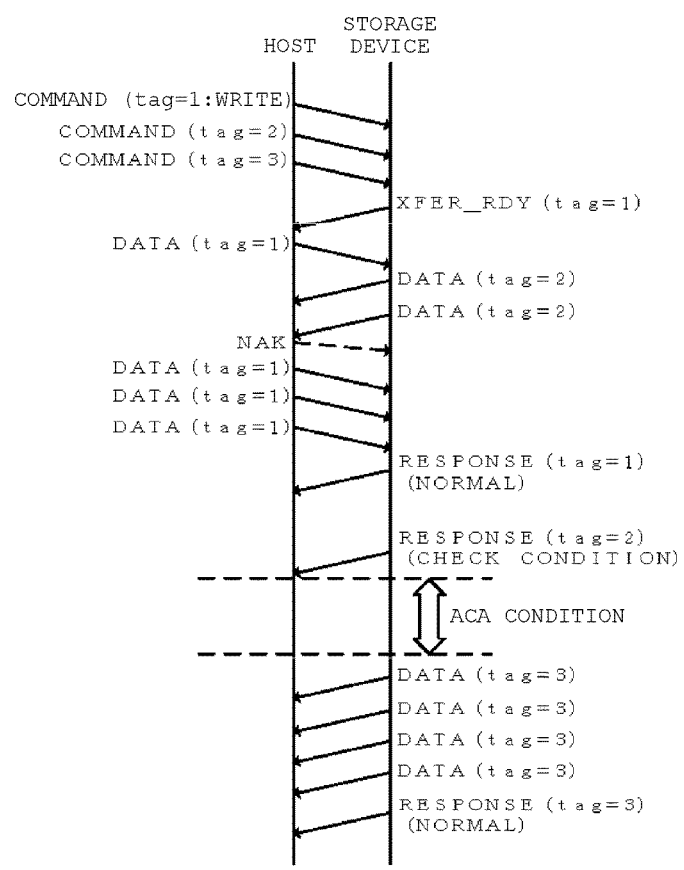
FIG. 10B illustrates an operation from generation of an ACA condition by the storage device according to the first embodiment to cancellation thereof.

FIGS. 10A and 10B show an example of an operation from the generation of the ACA condition by the storage device 1 according to the present embodiment to the cancellation thereof.

In FIG. 10A, the host 2 transmits three COMMAND frames, and issues all of read commands of tag=1, 2, and 3 in NACA=1. It is assumed that a total amount of transmission designated by each read command is four DATA frames.

The storage device 1 reads out data from the non-volatile storage medium 20 and transmits DATA frames of tag=1 and 2. Upon garbling of data occurs in a transmission path in the second DATA frame of tag=2, the host 2 gives a notice of an error by a negative acknowledgement (NAK) primitive. Here, the storage device 1 completes the total amount of transmission (four DATA frames) designated by a command, with respect to the command of tag=1 previously obtained by transmitting two DATA frames' worth of data before the transmission of a RESPONSE (CHECK CONDITION) frame of tag=2, that is, the generation of the ACA condition, and transmits a RESPONSE (NORMAL) frame indicating normal completion.

On the other hand, the ACA condition is generated with respect to a command of tag=3 in which a DATA frame has not been transmitted before the host 2 transmits a NAK primitive, and the transmission of a DATA frame is started after the ACA condition is canceled. Cancellation conditions of the ACA condition will be described below.

FIG. 10B shows a case where a command of tag=1 is a write command.

When the host 2 transmits a NAK primitive to the second DATA frame of tag=2, an XFER_RDY frame is already transmitted with respect to the command of tag=1, and the reception of a DATA frame is started. In this case, the storage device 1 completes the reception of data of a total amount of transmission designated by a command, transmits a RESPONSE (NORMAL) frame, and then generates an ACA condition.

Only the transmission or reception of data of the total amount of transmission designated by a command is completed before the ACA condition is generated, and the RESPONSE (NORMAL) frame may be transmitted after the ACA condition is canceled.

As described so far, in a case where the storage device 1 according to the present embodiment generates an error event serving as a condition of the generation of the ACA condition, the storage device 1 completes the transmission or reception of data of a total amount of transmission designated by a command with respect to the command being executed among commands that are received and held so far, and then generates the ACA condition.

Here, the holding of a certain command means a state from time when a RESPONSE frame is transmitted to the host 2 until a COMMAND frame is received by the host 2 or until the execution of the command is aborted. In addition, the command being executed means that at least one DATA frame is transmitted to the host 2 in response to a read command, and means that at least one XFER_RDY frame is transmitted to the host 2 in response to a write command.

Thereby, the execution of a command before and after the generation of the ACA condition is not divided into unexpected execution steps, and thus it is possible to simplify an error processing procedure.

Figure 11:
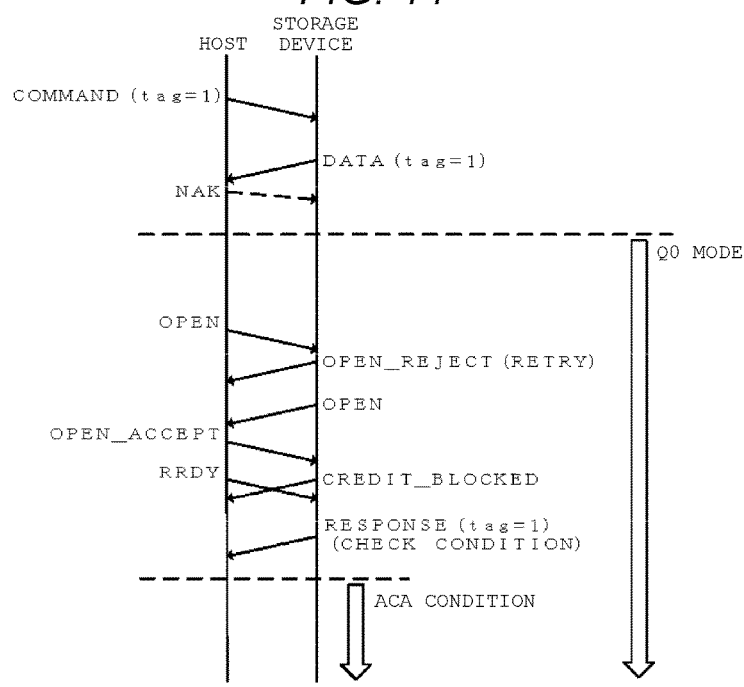
FIG. 11 illustrates an operation carried out when the storage device according to the first embodiment generates an ACA condition.

FIG. 11 shows an example of an operation when the storage device 1 according to the present embodiment transmits a RESPONSE (CHECK CONDITION) frame for generating an ACA condition.

In FIG. 11, the host 2 transmits a NAK primitive to a first DATA frame after a read command of tag=1 and NACA=1, and thus an error event serving as a condition of the generation of an ACA condition occurs.

Here, the FW is executed to set the link control unit 60 to be in a Q0 mode, set the execution management table 220, and transmit a RESPONSE (CHECK CONDITION) frame of tag=1. For this reason, when the RESPONSE (CHECK CONDITION) frame for generating an ACA condition is transmitted, another COMMAND frame is not received.

Thereby, it is possible to easily determine whether the COMMAND frame stored in the command table 130 is a COMMAND frame received before the generation of the ACA condition or is a COMMAND frame received after the generation of the ACA condition, and thus it is possible to simplify an error processing procedure.

It is also possible to determine whether the COMMAND frame stored in the command table 130 is received before or after the generation of the ACA condition by, for example, a time stamp without using the Q0 mode.

Figure 12:
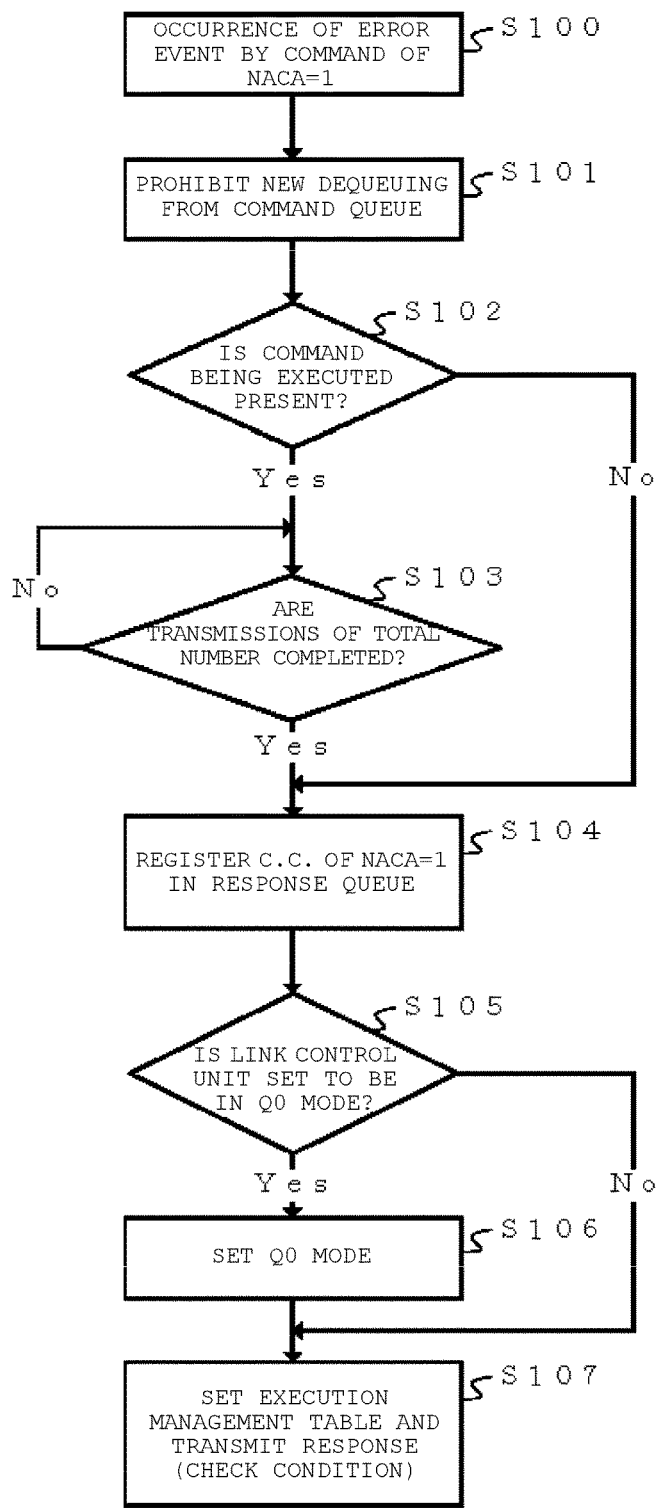
FIG. 12 is a flow chart showing an operation carried out when the storage device according to the first embodiment generates an ACA condition.

FIG. 12 is a flow chart showing the operation in accordance with execution of the FW when the storage device 1 of the present embodiment generates an ACA condition.

When an error event occurs regarding a command of NACA=1 (S100), the FW is executed to prohibit new dequeuing from the command queue 600 (S101). Thereby, a command which has not been executed is not executed until the prohibition of dequeuing is canceled.

Next, the FW is executed to confirm the presence or absence of a command being executed so far (S102). This is determined, for example, by comparing the number of expected transmissions and receptions stored as command control information 603 of the command queue 600 with the present number of expected transmissions and receptions (that is, midway course of transmission) which is stored in the execution management table 220.

In a case where the command being executed is present (S102: Yes), the FW is executed to wait for completion of transmissions of the total number with respect to the command (S103).

When the transmissions of the total number is completed with respect to all commands being executed (S103: Yes), the FW is executed to register a response having NACA=1 and CHECK CONDITION (C.C.) as the response control information 702 in the response queue 700 (S104).

After the link control unit 60 is set to be in the Q0 mode, if necessary (S105 to S106), the execution management table 220 is set (S107). Thereby, a RESPONSE (CHECK CONDITION) frame is transmitted, thereby generating an ACA condition.

Figure 13:
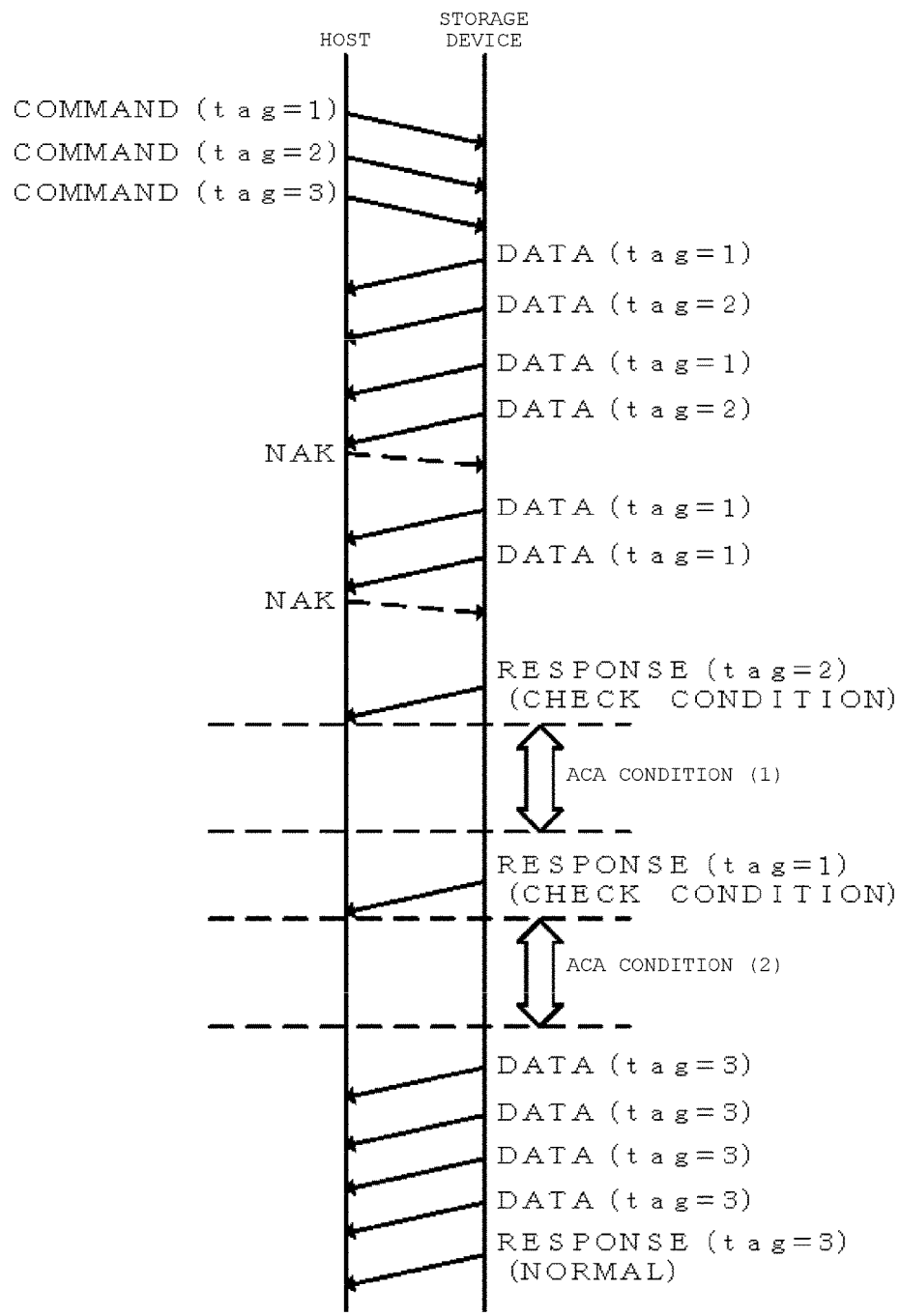
FIG. 13 illustrates an operation carried out when an error occurs in accordance with a command being executed in the storage device according to the first embodiment.

Operation when Another Error Event Occurs after Condition of Generation of ACA Condition is Generated FIG. 13 illustrates an operation in a case where an error occurs regarding a command being executed while the storage device 1 according to the present embodiment waits for completion of transmissions of the total number with respect to the command. Here, the steps are the same as those illustrated in FIG. 10A up to a point where the host 2 gives a notice of an error by a NAK primitive with respect to the second DATA frame of tag=2.

As described above, the storage device 1 attempts to complete the total amount of transmission (four DATA frames) designated by a command before the generation of an ACA condition with respect to a command of tag=1 previously obtained by transmitting two DATA frames' worth of data, but the host 2 gives a notice of an error by a NAK primitive with respect to the fourth DATA frame of tag=1.

Here, a NAK primitive for tag=2, a NAK primitive for tag=1, and two error events serving as conditions of the generation of an ACA condition occur. In this case, the storage device 1 suspends a report to the host 2 with respect to an error event (NAK primitive for tag=1) which occurred later.

An error event (NAK primitive for tag=2) which occurred first is reported to the host 2, thereby generating and canceling an ACA condition (1). Then, an error event (NAK primitive for tag=1) which occurred later is reported to the host 2, thereby generating an ACA condition (2). With respect to a command of tag=3, the ACA condition (2) is generated and canceled, and is then started to be executed.

In this manner, in a case where a plurality of error events serving as conditions of the generation of the ACA condition occur, the error events are reported to the host 2 in order of the occurrence of the error events, and thus it is possible to simplify an error processing procedure.

FIG. 14 illustrates another example of an operation in a case where an error occurs regarding a command being executed while the storage device 1 according to the present embodiment waits for the completion of transmissions of the total number with respect to the command. A difference from FIG. 13 is in that a command of tag=1 is issued in NACA=0.

In this case, an error event (NAK primitive for tag=1) which occurred later is reported to the host 2 before an error event (NAK primitive for tag=2) which occurred first is reported to the host 2. This is because a command of tag=1 is NACA=0, and an error event is not a condition of the generation of an ACA condition in spite of the error event, which makes a problem of complication of an error processing procedure less likely to occur.

Even in this case, an error event (NAK primitive for tag=1) which occurred later may be reported to the host 2 after an ACA condition is generated and canceled, thereby standardizing a process procedure using the FW.

FIGS. 15A to 15C show examples of first operations of the command queue 600 and the response queue 700 when the FW in the present embodiment is executed to handle an error event.

In FIG. 15A, four commands (tag=1 to 4, each of which is a read command of NACA=1) which are received from the host 2 are stored in the command queue 600, while the response queue 700 is empty.

The commands of tag=1 and 2 are started to be executed during a period from FIG. 15A to FIG. 15B, and an error event occurs in tag=1. Accordingly, the FW is executed to register the response control information 702 in the response queue 700 as NACA=1 and CHECK CONDITION (C.C.) with respect to tag=1. In addition, the dequeuing of the command queue 600 is prohibited, tag=3 and 4 before the start of execution are not dequeued. At this time, a command of tag=2 is executed.

Thereafter, an error event occurs with respect to a command of tag=2 which has waited for the completion of transmissions of the total number during a period from FIG. 15B to FIG. 15C, and thus the FW is executed to return the command of tag=2 to the head of the command queue 600. At this time, the command control information 603 is set as an error.

Thereby, when the prohibition of dequeuing of the command queue 600 is canceled and the command of tag=2 is dequeued, it is possible to recognize that an error has to be reported without performing data transmission on the command of tag=2.

FIG. 16 is a flow chart showing the operation carried out in accordance with execution of the FW for performing control shown in FIGS. 15A to 15C when another error event occurs while the storage device 1 according to the present embodiment waits for the completion of transmissions of the total number. A process in this flow chart is equivalent to the process performed in S103 in FIG. 12.

In a case where a new error event occurs (S201: Yes) while the completion of transmissions of the total number is waited for (S200), command control information 603 of the command is registered as an error in the head of the command queue 600 (S202).

FIGS. 17A to 17C show examples of second operations of the command queue 600 and the response queue 700 when the FW in the present embodiment is executed to process an error event. FIG. 17A is the same as FIG. 15A, FIG. 17B is the same as FIG. 15B, and only FIG. 17C is different from FIG. 15C.

Since an error event also occurs with respect to a command of tag=2 which waits for the completion of transmissions of the total number during a period from FIG. 17B to FIG. 17C, the FW is executed to register a response of tag=2 in the response queue 700. At this time, the response control information 702 is set as NACA=1 and CHECK CONDITION (C.C.), and the dequeuing of the response of tag=2 from the response queue 700 is prohibited.

Thereby, when the prohibition of dequeuing of the response of tag=2 is canceled and the response of tag=2 is dequeued, it is possible to recognize that an error has to be reported by the response of tag=2.

FIG. 18 is a flow chart showing the operation carried out in accordance with execution of the FW for performing control shown in FIGS. 17A to 17C when another error event occurs while the storage device 1 according to the present embodiment waits for the completion of transmissions of the total number. A process in this flow chart is equivalent to the process performed in S103 in FIG. 12.

In a case where a new error event occurs (S301: Yes) while the completion of transmissions of the total number is waited for (S300), the dequeuing of a response with respect to the command is prohibited and response control information 702 is registered in a response queue as CHECK CONDITION (C.C.) (S302).

Operation in ACA Condition

Figure 19A:
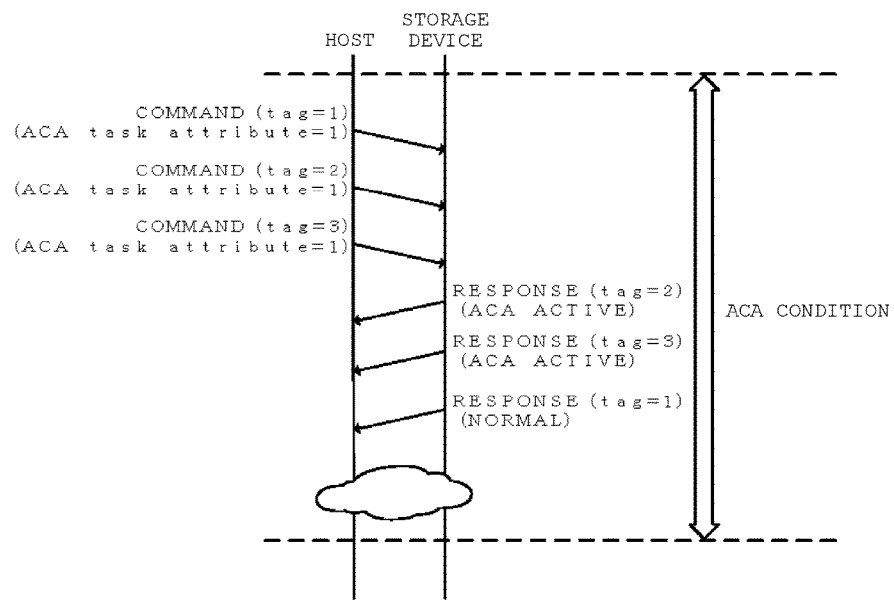
FIG. 19A illustrates an operation carried out during an ACA condition specified by an SCSI standard being set.
Figure 19B:
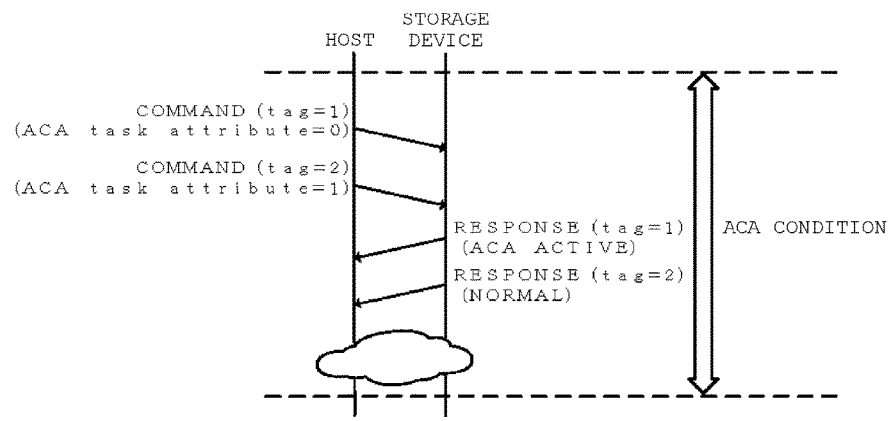
FIG. 19B illustrates another operation carried out during an ACA condition specified by an SCSI standard being set.

FIGS. 19A and 19B show an operation during an ACA condition specified by an SCSI standard.

The host 2 sets an ACA task attribute within a command to 1 and transmits the ACA task attribute with respect to a command which is desired to be executed during an ACA condition. In addition, the host 2 must not issue the next command until the host receives a report of the termination with respect to an issued command. That is, the number of commands capable of being queued during an ACA condition is one. Thereby, the host 2 can appropriately issue an error processing command to the storage device 1.

As shown in FIG. 19A, in a case where the host 2 issues another command (tag=2 and 3) before the host receives a report of the termination with respect to an issued command (tag=1), the storage device 1 reports an error referred to as "ACA ACTIVE" with respect to the command.

In addition, as shown in FIG. 19B, even in a case where a limit of the number of commands capable of being queued being one is kept, the storage device 1 reports an error referred to as "ACA ACTIVE" with respect to a command (tag=1) in which an ACA task attribute is issued in 0 during an ACA condition.

When a TMF_ONLY bit in a control mode page is set, the storage device 1 reports an error referred to as "ACA ACTIVE" with any command received during the ACA condition.

In a case where the storage device 1 and a plurality of hosts 2 are communicably connected to each other through an expander, whether the storage device 1 executes a command received from a host 2 (hereinafter, referred to as "another host") other than a host 2 generating an ACA condition varies depending on the setting of a TST field in a control mode page.

That is, regarding a command received from another host, only a special command (PERSISTENT RESERVE OUT) is executed when TST=000b regardless of an ACA task attribute, the storage device 1 reports an error of "ACA ACTIVE" or "BUSY" with respect to another command.

On the other hand, regarding a command having one ACA task attribute which is received from another host, the storage device 1 reports an error of "CHECK CONDITION" when TST=001b, but a command having no ACA task attribute is executed normally.

All of the reports of "ACA ACTIVE" (or "BUSY") have to be completed before the cancellation of the ACA condition. A condition of the cancellation of the ACA condition will be described below.

Figure 20A:
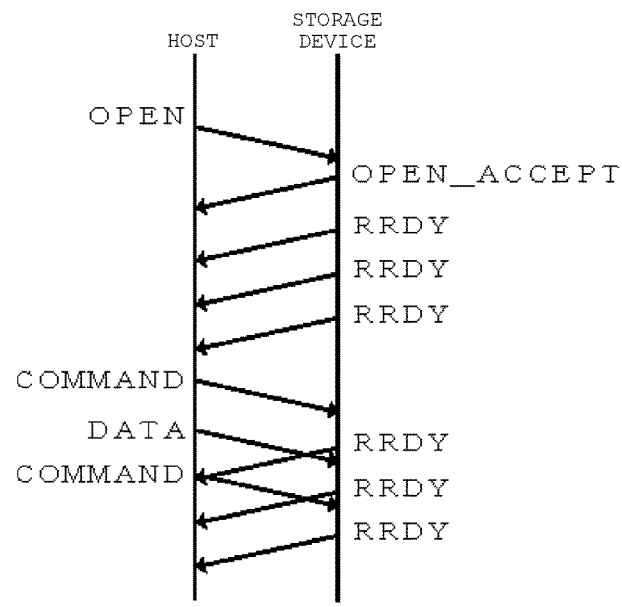
FIG. 20A illustrates an operation of a Q1 mode in the storage device according to the first embodiment.
Figure 20B:
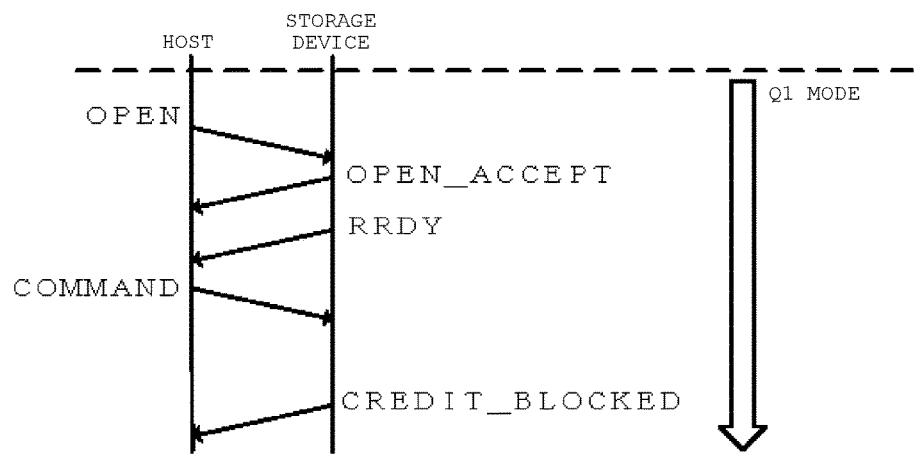
FIG. 20B illustrates another operation of the Q1 mode in the storage device according to the first embodiment.
Figure 20C:
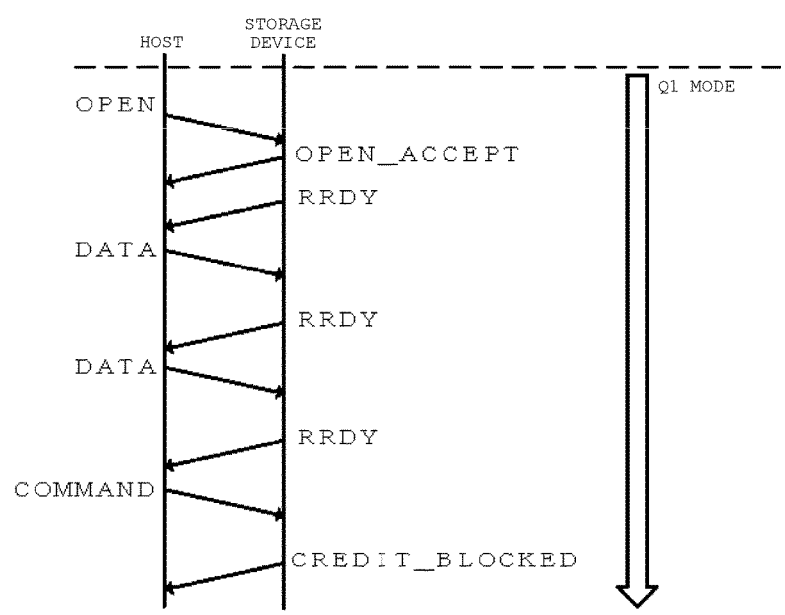
FIG. 20C illustrates another operation of the Q1 mode in the storage device according to the first embodiment.

FIGS. 20A to 20C show an operation in a Q1 mode which is one of command reception restriction modes of the storage device 1 according to the present embodiment. Control of a link layer which is performed by the link control unit 60, which is omitted in FIGS. 4A to 4C, is partially described.

An operation shown in FIG. 20A is an operation in a normal mode in which the reception of a command is not particularly restricted. As described above, in an SAS interface, a side receiving an OPEN address frame responds as an OPEN_ACCEPT primitive in a case of accepting a connection request, and has to notify a counterpart of the number of frames (at least one), which are capable of being received within 1 ms from the response, by a receiver ready (RRDY) primitive.

At this time, the number of RRDY primitives capable of being transmitted is determined based on the size of the reception frame FIFO 110, and a maximum of three RRDY primitives can be transmitted in the present embodiment. When a frame is received from the host 2 and is then extracted from the reception frame FIFO 110, it is possible to additionally transmit one RRDY primitive and to notify the host 2 that one frame can be received.

FIGS. 20B and 20C show an operation in a case where the link control unit 60 is set to be in the Q1 mode.

In the Q1 mode, only one RRDY is transmitted after responding an OPEN_ACCEPT primitive. In a case where a frame extracted from the reception frame FIFO 110 is a COMMAND frame, a CREDIT_BLOCKED primitive is transmitted instead of a RRDY primitive as shown in FIG. 20B, and the host 2 is notified that a frame is not received any more in the connection. On the other hand, in a case where a frame extracted from the reception frame FIFO 110 is not a COMMAND frame, one RRDY primitive is transmitted as shown in FIG. 20C.

Incidentally, as described above, the number of commands capable of being queued during an ACA condition is one. The number of commands queued is originally managed by the host 2. However, the storage device 1 according to the present embodiment sets the link control unit 60 to be in the Q1 mode after the generation of the ACA condition, and thus it is possible to limit the number of commands capable of being queued to one. Thereby, it is possible to suppress the generation of a condition "ACA ACTIVE" by reception of a plurality of commands, as shown in FIG. 19A.

The Q1 mode is set only in a case where a counterpart that establishes connection at present is the host 2 generating the ACA condition, and a normal mode in which the reception of a command is not particularly restricted may be set in a case where the counterpart is another host (particularly, in a case of TST=001b). In this case, the FW is executed to set an identifier for identifying the host 2 performing setting to a Q1 mode in the link control unit 60 in advance, and thus the link control unit 60 can determine a normal mode or a Q1 mode at the time of the establishment of connection.

Figure 21:
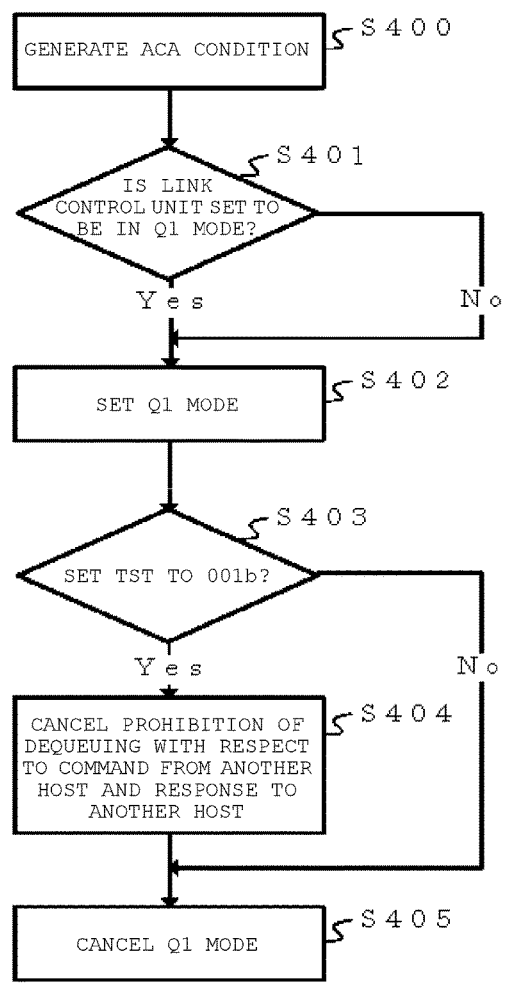
FIG. 21 is a flow chart showing an operation carried out after the storage device according to the first embodiment generates an ACA condition.

FIG. 21 is a flow chart showing the operation carried out in accordance with execution of the FW after the storage device 1 according to the present embodiment generates an ACA condition. A start step (S400) of this flow chart is equivalent to S107 in FIG. 12.

After the ACA condition is generated (S400), the link control unit 60 is set to be in the Q1 mode when necessary (S401 to S402). When a TST field in a control mode page is set to 001b (S403: Yes), the prohibition of dequeuing from the command queue 600 and the response queue 700 is canceled with respect to a command received from another host and a response transmitted to another host (S404), thereby allowing a command to be executed even during the ACA condition. Thereafter, the Q1 mode is canceled (S405).

Operation when ACA Condition is Canceled

Figure 22:
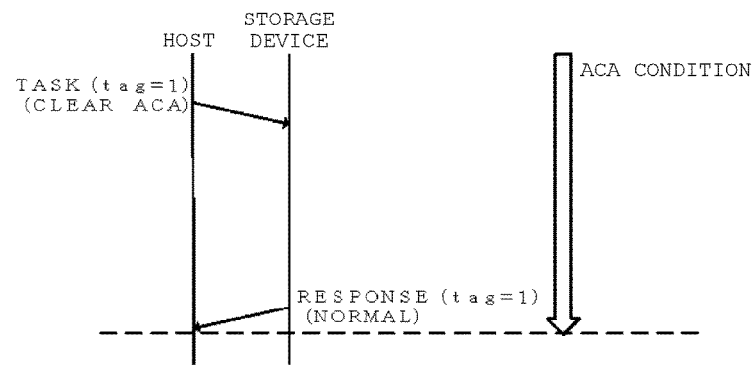
FIG. 22 illustrates an operation carried out when an ACA condition specified by an SCSI standard is canceled.

FIG. 22 shows an operation when the ACA condition specified by an SCSI standard is canceled.

When the host 2 completes error processing and determines to cancel the ACA condition, the host 2 issues a task in which a CLEAR ACA attribute is set to 1. The storage device 1 reports the normal termination of the task to the host 2, and then the ACA condition is canceled.

Other cancellation conditions include the normal termination of a special command (PERSISTENT RESERVE OUT), the termination of an error of an ACA task attribute command, and the like.

Figure 23:
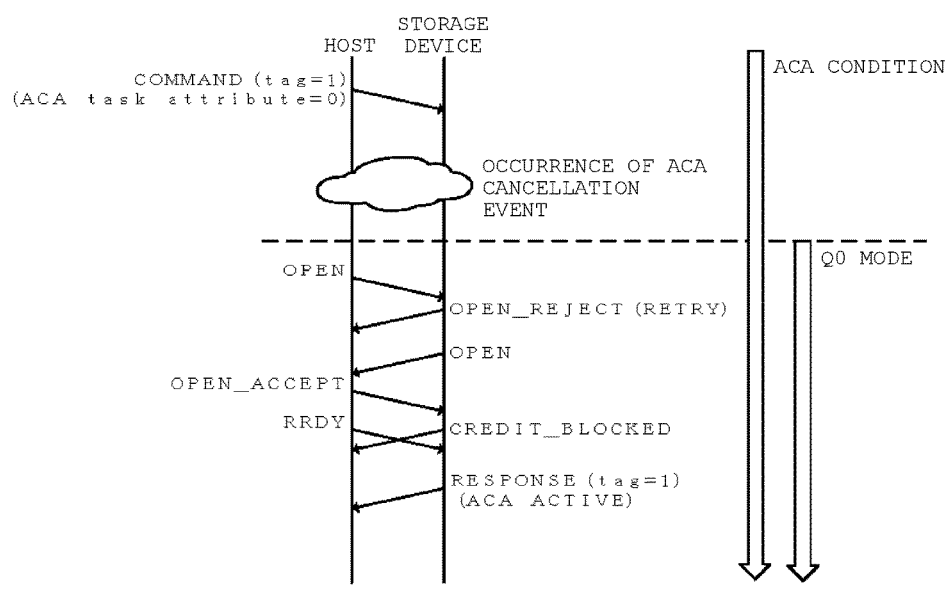
FIG. 23 illustrates an operation carried out when the storage device according to the first embodiment generates a cancellation event of an ACA condition and then transmits a response frame.

FIG. 23 shows an example of an operation when the storage device 1 according to the present embodiment transmits a RESPONSE (ACA ACTIVE) frame after a cancellation event of the ACA condition occurs.

In FIG. 23, after a COMMAND frame of ACA task attribute=0, which is a condition of the report of "ACA ACTIVE", is issued in tag=1, the cancellation event of the ACA condition occurs.

In this case, the FW is executed to set the link control unit 60 to be in the Q0 mode, sets the execution management table 220, and then transmits a RESPONSE (ACA ACTIVE) frame of tag=1.

As described above, all of the RESPONSE (ACA ACTIVE) frames have to be transmitted before the cancellation of the ACA condition. The link control unit 60 is set to be in the Q0 mode, and thus it is possible to transmit a RESPONSE (ACA ACTIVE) frame while preventing the reception of any more COMMAND frame (further, the generation of a condition of the report of any more "ACA ACTIVE").

Figure 24:
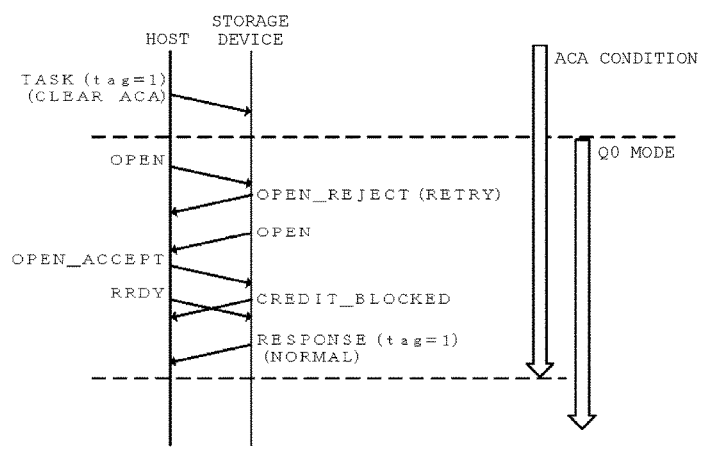
FIG. 24 illustrates an operation carried out when the storage device according to the first embodiment cancels an ACA condition.

FIG. 24 shows an operation when the storage device 1 according to the present embodiment cancels an ACA condition.

In FIG. 24, a TASK (CLEAR ACA) frame of tag=1 is issued from the host 2. In order to response to this, the FW is executed to set the link control unit 60 to be in a Q0 mode, set the execution management table 220, and then transmit a RESPONSE (NORMAL) frame.

Thereby, it is possible to transmit a RESPONSE (NORMAL) frame for canceling the ACA condition while preventing the reception of any more COMMAND frame (further, the generation of the condition of the report of "ACA ACTIVE").

Figure 25:
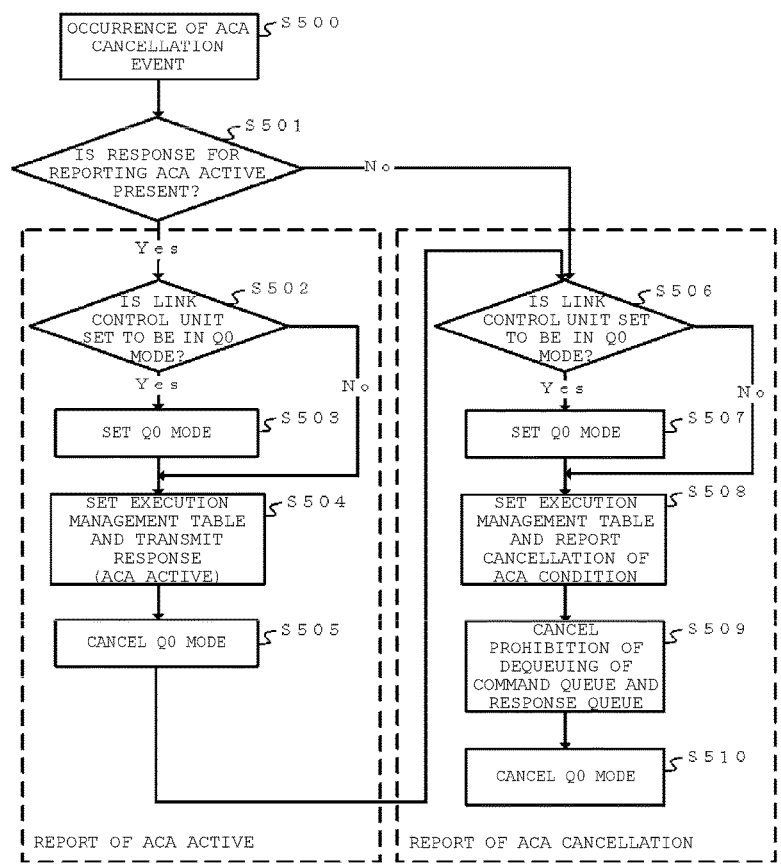
FIG. 25 is a flow chart showing an operation carried out when the storage device according to the first embodiment cancels an ACA condition.

FIG. 25 is a flow chart showing an operation carried out in accordance with execution of the FW when the storage device 1 of the present embodiment cancels an ACA condition.

When a cancellation event of an ACA condition occurs (S500), the FW is executed to determine whether or not a response of an "ACA ACTIVE" attribute is present in the response queue 700 (S501). In a case where the response of an "ACA ACTIVE" attribute is present (S501: Yes), the link control unit 60 is set to be in the Q0 mode when necessary (S502 to S503), and the execution management table 220 is set (S504). Thereby, a RESPONSE (ACA ACTIVE) frame is transmitted. Next, the FW is executed to cancel the Q0 mode (S505). Meanwhile, S505 may be omitted in a case where the Q0 mode is set in the next S506.

In a case where a response reporting "ACA ACTIVE" is not present (S501: No) and after the report of "ACA ACTIVE" is completed, the link control unit 60 is set to be in the Q0 mode when necessary (S506 to S507), and the execution management table 220 is set (S508). Thereby, a RESPONSE (NORMAL) frame is transmitted, and the ACA condition is canceled. After the ACA condition is canceled, the prohibition of dequeuing of the command queue 600 and the response queue 700 is canceled (S509), and the Q0 mode is canceled (S510).

According to the above-described storage device according to the first embodiment, the execution and reception of a command are restricted at the time of the generation and cancellation of an ACA condition, and thus it is possible to simplify an error processing procedure.

Second Embodiment

In the storage device 1 according to the first embodiment, in a case where an error event that qualifies as a condition of the generation of an ACA condition occurs, execution is completed until the transmission of DATA frames of a total number designated by a command or the reception of a RESPONSE (NORMAL) frame with respect to a read command being executed so far, and then an ACA condition is generated.

On the other hand, in a storage device 1 according to the present embodiment, when an error event qualifying as a condition of generating an ACA condition occurs, an execution step to be completed until the generation of the ACA condition is changed based on where read data are present within the storage device 1.

FIG. 26 shows an example of a state of read data of a read command being executed, when an error event serving as a condition of the generation of an ACA condition occurs.

Here, regarding data to be transmitted to a host 2 in the execution of the read command, it is assumed that 15 frames of DATA1 to DATA15 remain. In addition, three frames of DATA1 to DATA3 are read out from the buffer 30, six frames of DATA4 to DATA9 are stored in a buffer 30, and six frames of DATA10 to DATA15 have not been yet read from the non-volatile storage medium 20.

At this time, the following three execution steps can be selected as execution steps to be completed until the generation of the ACA condition.

(R1) The transmission of read data read out from the buffer 30 is completed.

(R2) The transmission of a portion or the entirety of read data stored in the buffer 30 and/or a portion of read data which is newly read out from the non-volatile storage medium 20 is completed.

(R3) The transmission of all of pieces of read data designated by a read command is completed.

In a case where (R1) is selected, an ACA condition is generated after three frames of DATA1 to DATA3 are transmitted to the host 2. Thereby, it is possible to reduce a time from the occurrence of an error event to the generation of the ACA condition.

At this time, some or all of DATA4 to DATA9 stored in the buffer 30 may be discarded. Thereby, it is possible to increase the efficiency of using the buffer.

In a case where (R2) is selected, an ACA condition is generated after some or all of DATA1 to DATA9 are transmitted to the host 2. Thereby, it is possible to increase efficiency of using the buffer 30 while reducing a time from the occurrence of an error event to the generation of the ACA condition.

On the other hand, an ACA condition may be generated after some or all of DATA1 to DATA9 are transmitted to the host 2 and some or all of DATA10 to DATA15 are stored in the buffer 30. Further, an ACA condition may be generated after some of DATA10 to DATA15 are transmitted to the host 2. Thereby, it is possible to reduce a time period from time when the ACA condition is canceled to time when execution of the command is restarted.

In a case where (R3) is selected, an ACA condition is generated after 15 frames of DATA1 to DATA15 are transmitted to the host 2. This operation is the same as that in the first embodiment.

FIGS. 27A to 27C show examples of operations of the command queue 600 and the response queue 700 when the processing of (R1) or (R2) mentioned above is performed. FIG. 27A is the same as FIG. 15A, FIG. 27B is the same as FIG. 15B, and only FIG. 27C is different from FIG. 15C.

The transmission of read data (case of (R1)) which are read out from the buffer 30 during a period from FIG. 27B to FIG. 27C or a portion or the entirety of read data (case of (R2)) stored in the buffer 30 to the host 2 is completed.

The FW is executed to return a command of tag=2 to the head of the command queue 600. However, at this time, execution restart conditions (an LBA and a remaining number of transmissions) which correspond to each case are set in command control information 603. That is, an address obtained by adding 1 to an LBA in which the transmission of read data to the host 2 is completed is set to be a start LBA after the restart of execution, and the number of transmissions obtained by subtracting the number of transmissions in which transmission to the host 2 is completed from a total number of transmissions designated by commands is set to be the number of transmissions after the restart of execution.

Thereby, it is possible to appropriately restart a command of tag=2 after the prohibition of dequeuing of the command queue 600 is canceled.

Figure 28A:
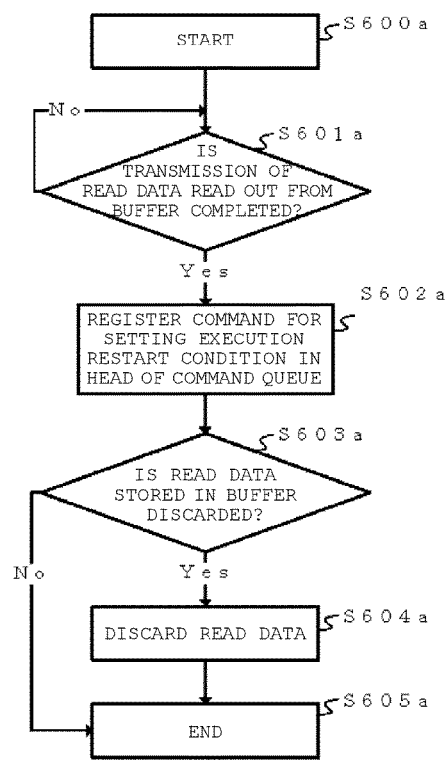
FIGS. 28A and 28B are flow charts showing an operation when the storage device according to the second embodiment processes an error event.
Figure 28B:
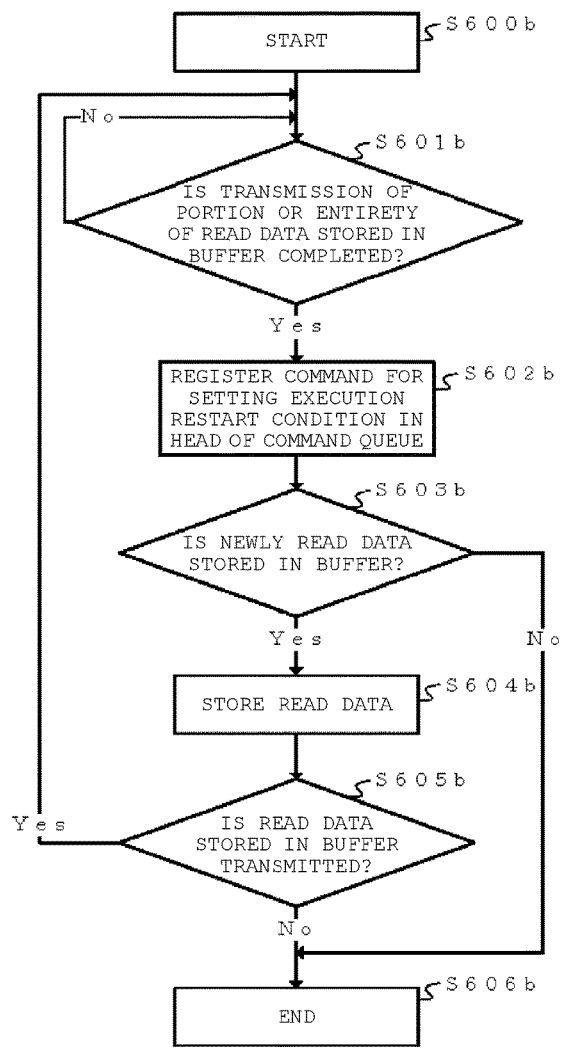

FIGS. 28A and 28B are flow charts showing the operation carried out in accordance with execution of the FW when the process of the above-mentioned (R1) or (R2) is performed. FIG. 28A corresponds to (R1), and FIG. 28B corresponds to (R2). The process of S103 in the flow chart in FIG. 12 in the first embodiment is replaced with a process of the flow chart in FIG. 28A or 28B in the present embodiment.

The completion of transmission of a portion or the entirety of read data read out from the buffer 30 or read data stored in the buffer 30 to the host 2 is waited for with respect to a read command being executed (S601a, S601b).

When the transmission of read data to the host 2 is completed, the command is registered in the head of the command queue 600. At this time, an execution restart condition is set (S602a, S602b). Thereafter, read data stored in the buffer 30 are discarded when necessary, or new read data are stored in the buffer 30 (S603a and S604a, S603b and S604b). Further, in the case of (R2), read data which are newly stored in the buffer 30 may be transmitted to the host 2 (S605b).

According to the above-described storage device according to the second embodiment, an execution step to be completed until generation of an ACA condition is changed depending on a state where read data are stored, and thus it is possible to simplify an error processing procedure while preventing the generation of the ACA condition from being excessively delayed.

Third Embodiment

In the storage device 1 according to the first embodiment, in a case where an error event qualifying as a condition of the generation of an ACA condition occurs, execution is completed until the reception of DATA frames of a total number of transmissions designated by a command or the transmission of a RESPONSE (NORMAL) frame with respect to a write command being executed so far, and then an ACA condition is generated.

On the other hand, in a storage device 1 according to the present embodiment, an execution step to be completed until the generation of an ACA condition is changed based on a state where write data are received when an error event qualifying as a condition of generating the ACA condition occurs, and where write data are present within the storage device 1.

Figure 29:
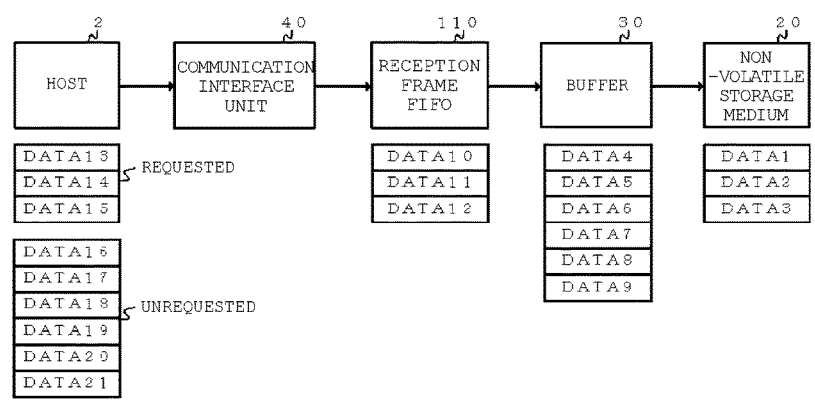
FIG. 29 shows a state of write data associated with a write command being executed in a storage device according to a third embodiment.

FIG. 29 shows an example of the state of write data corresponding to a write command being executed when an error event qualifying as a condition of generating the ACA condition occurs.

Here, pieces of data to be received from a host 2 in the execution of the write command are 22 frames of DATA1 to DATA21. Write data corresponding to 15 frames of DATA1 to DATA15 are requested from the host 2 with an XFER_RDY frame which is first transmitted, but six frames of DATA16 to DATA21 have not been requested yet.

Three frames of DATA1 to DATA3 are stored in the non-volatile storage medium 20, six frames of DATA4 to DATA9 are stored in the buffer 30, three frames of DATA10 to DATA12 are stored in the reception frame FIFO 110, and three frames of DATA13 to DATA15 have not been received yet from the host 2.

At this time, the following four execution steps can be selected as execution steps to be completed until the generation of an ACA condition.

(W1) Write data requested with an XFER_RDY frame is stored in at least the buffer 30.

(W2) Write data requested with an XFER_RDY frame is stored in the non-volatile storage medium 20.

(W3) All of write data designated by a write command are stored in at least the buffer 30.

(W4) All of write data designated by a write command are stored in the non-volatile storage medium 20.

In a case where (W1) is selected, an ACA condition is generated after six frames of DATA10 to DATA15 are stored in the buffer 30. Thereby, it is possible to reduce a time from the occurrence of an error event to the generation of the ACA condition.

Some or all of the six frames of DATA4 to DATA9 and six frames of DATA10 to DATA15 may be stored in the non-volatile storage medium 20 in a case where an empty space of the buffer 30 is not sufficient.

In a case where (W2) is selected, an ACA condition is generated after 12 frames of DATA4 to DATA15 are stored in the non-volatile storage medium 20. Thereby, it is possible to increase efficiency of using the buffer 30 while reducing a time from the occurrence of an error event to the generation of the ACA condition.

In a case where (W3) is selected, an XFER_RDY frame is transmitted after three frames of DATA13 to DATA15 are received from the host 2, and an ACA condition is generated after six frames of DATA16 to DATA21 are stored in the buffer 30.

Similarly to the case of (W1), even in this case, some or all of 12 frames of DATA4 to DATA15 and six frames of DATA16 to DATA21 may be stored in the non-volatile storage medium 20 in a case where an empty space of the buffer 30 is not sufficient.

In a case where (W4) is selected, an XFER_RDY frame is transmitted after three frames of DATA13 to DATA15 are received from the host 2, and an ACA condition is generated after six frames of DATA16 to DATA21 are stored in the non-volatile storage medium 20.

Operations of a command queue 600 and a response queue 700 at the time of performing the process of the above-mentioned (W1) or (W2) are the same as those in FIGS. 27A to 27C described in the second embodiment, and thus description thereof will not be repeated here.

Figure 30:
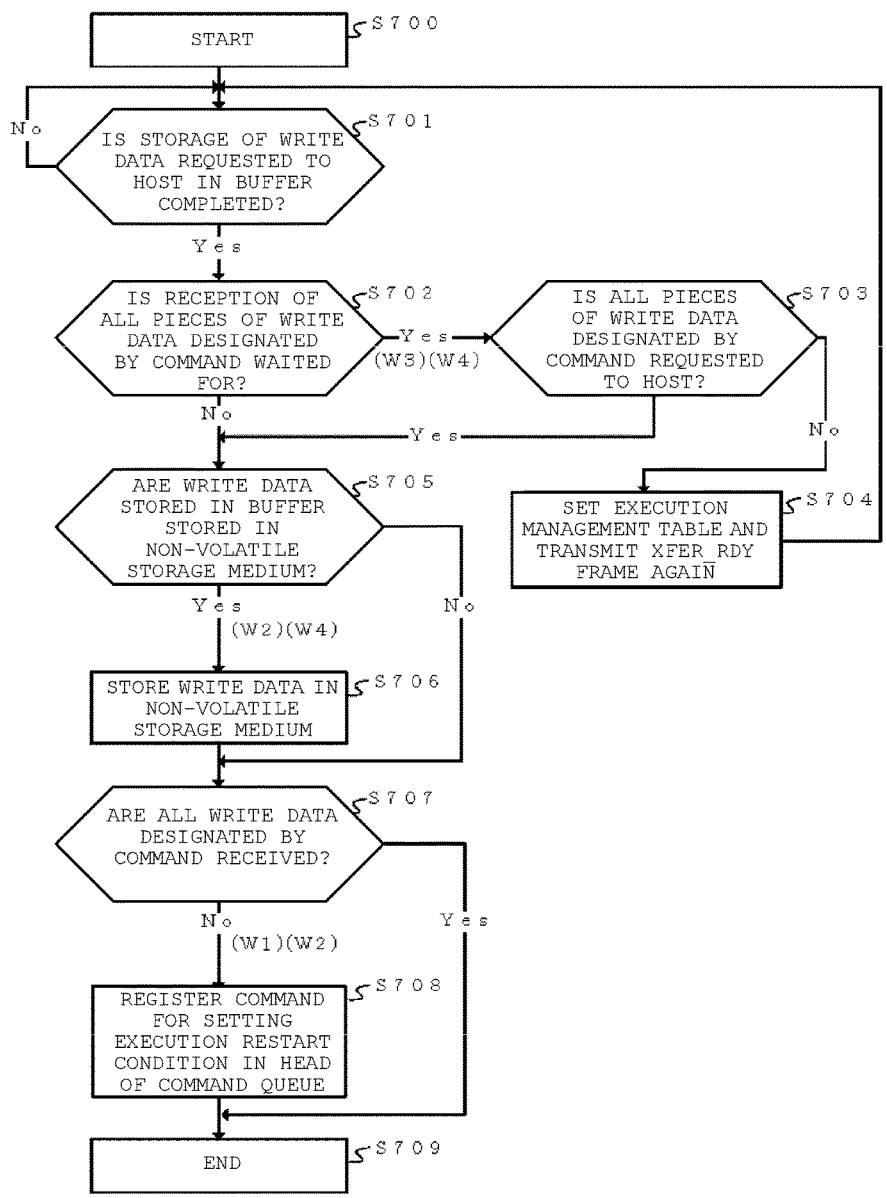
FIG. 30 is a flow chart showing an operation when the storage device according to the third embodiment processes an error event.

FIG. 30 is a flow chart showing the operation of the FW when the processes of the above-mentioned (W1) to (W4) are performed. The process of S103 in the flow chart in FIG. 12 of the first embodiment is replaced with a process of the flow chart in FIG. 30 in the present embodiment.

Regarding a write command being executed, the storage of write data requested from the host 2 with an XFER_RDY frame, which is finally transmitted, in the buffer 30 is waited for (S701).

Next, in a case where the reception of all write data designated by a write command is waited for (S702: Yes, that is, in the case of (W3) and (W4)), all of write data designated by the write command are requested from the host 2 (S703 to S704).

In a case where predetermined write data are stored in the non-volatile storage medium 20 after the storage of the write data in the buffer 30 is completed (S705: Yes, that is, the cases of (W2) and (W4)), write data are stored in the non-volatile storage medium 20 (S706).

In a case where all of write data designated by the write command have not been received (S707: No, that is, the cases of (W1) and (W2)), the command is registered in the head of the command queue 600. At this time, an execution restart condition is set (S708).

According to the above-described storage device according to the third embodiment, an execution step to be completed until the generation of an ACA condition is changed depending on a state where write data are received. As a result, it is possible to simplify an error processing procedure while preventing the generation of the ACA condition from being excessively delayed.

Fourth Embodiment

In a storage device 1 according to the present embodiment, (R1) to (R3) described in the second embodiment and (W1) to (W4) described in the third embodiment are selected depending on a remaining number of transmissions.

That is, as shown in FIG. 31A, two threshold values (a first threshold value is set to be larger than a second threshold value) are provided with respect to a remaining number of transmissions of read data to be transmitted to the host 2 from now in a total amount of transmission designated by a read command. When the remaining number of transmissions≥the first threshold value, (R1) is selected. When the first threshold value>the remaining number of transmissions≥the second threshold value, (R2) is selected. When the remaining number of transmissions<the second threshold value, (R3) is selected.

As shown in FIG. 31B, a threshold value is provided with respect to a remaining number of transmissions of write data to be received from the host 2 from now in a total amount of transmission designated by a write command. When the remaining number of transmissions≥a third threshold value, (W1) or (W2) is selected. When the third threshold value>the remaining number of transmissions, (W3) or (W4) is selected.

In a case where a time limit until the generation of an ACA condition is determined, the above-mentioned first to third threshold values are determined according to an execution time until a predetermined execution step of a command being executed, and (R1) to (R3) and (W1) to (W4) may be selected.

Further, an empty space of the buffer 30 may be associated with a condition of the selection of (R1) to (R3) and (W1) to (W4). In this case, when the empty space of the buffer 30 is small, (R2), (W2), and (W4) are selected.

According to the above-described storage device according to the fourth embodiment, an execution step to be completed until the generation of an ACA condition is changed depending on a state where read data are stored and a state where write data are received. As a result, it is possible to simplify an error processing procedure while preventing the generation of the ACA condition from being excessively delayed.

According to the above-described storage device according to at least one embodiment, the execution and reception of a command are restricted at the time of the generation and cancellation of an ACA condition, and thus it is possible to simplify an error processing procedure.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
   a non-volatile storage; and
   a controller configured to carry out, in parallel, operations in response to a plurality of commands received from a host and queued in a command queue, wherein
   when the controller detects an error in a first operation that is being carried out in response to a first command while the controller is in parallel carrying out a second operation in response to a second command, the controller continues to carry out the second operation until a predetermined condition is met while carrying out the second operation and, at that time when the predetermined condition is met, transmits an error event notification to the host, and
   in a time period between detecting the error and transmitting the error event notification to the host, the controller rejects receipt of new commands from the host.

2. The storage device according to claim 1, wherein after transmitting the error event notification to the host, the controller accepts a limited number of new commands from the host.

3. The storage device according to claim 2, wherein even after transmitting the error event notification to the host, the controller is not limited in receiving new commands from other hosts.

4. The storage device according to claim 1, wherein the predetermined condition is detecting an error in the second operation.

5. The storage device according to claim 1, wherein the predetermined condition is a completion of the second command.

6. The storage device according to claim 1, further comprising:
a data buffer, in which the controller temporarily stores data read from the non-volatile storage in response to a read command, wherein
when the second command includes a read command, the predetermined condition is the transmission of some of the read data stored in the data buffer to the host.

7. The storage device according to claim 1, further comprising:
a data buffer, in which the controller temporarily stores data read from the non-volatile storage in response to a read command, wherein
when the second command includes a read command, the predetermined condition is the transmission of all of the read data stored in the data buffer to the host.

8. The storage device according to claim 7, wherein
the controller is further configured to erase all of the read data stored in the data buffer that have been transmitted to the host.

9. The storage device according to claim 1, wherein
when the second command includes a write command, the predetermined condition is a reception of all write data associated with the write command.

10. A storage device comprising:
a non-volatile storage; and
a controller configured to carry out, in parallel, operations with respect to the non-volatile storage in accordance with a plurality of commands that is received from a host and queued in a command queue, wherein
when the controller detects an error in a first operation that is being carried out in response to a first command while the controller is in parallel carrying out a second operation in response to a second command, the controller defers transmitting an error event notification for the error in the first operation, and then
when the controller detects an error in the second operation while deferring the transmission of the error event notification for the error in the first operation, the controller, responsive to said detecting, transmits the error event notification for the error in the first operation and an error notification for the error in the second operation and enters into an error processing state.

11. The storage device according to claim 10, wherein the controller continues to carry out the second operation but not the first operation while the transmission of the error event notification for the error in the first operation is deferred.

12. The storage device according to claim 11, wherein
the controller accepts no new commands from the host while the transmission of the error event notification for the error in the first operation is deferred.

13. A method of controlling a storage device having a non-volatile storage, comprising:
carrying out, in parallel, operations in response to a plurality of commands received from a host and queued in a command queue;
when an error is detected in a first operation that is being carried out in response to a first command while a second operation is carried out in parallel in response to a second command, continuing to carry out the second operation until a predetermined condition is met while carrying out the second operation and, at that time when the predetermined condition is met, transmitting an error event notification to the host; and
in a time period between detecting the error and transmitting the error event notification to the host, rejecting receipt of new commands from the host.

14. The method according to claim 13, further comprising:
after transmitting the error event notification to the host, accepting a limited number of new commands from the host.

15. The method according to claim 14, wherein
in the second state, acceptance of new commands from other hosts is not limited.

16. The method according to claim 13, wherein the predetermined condition is detecting an error in the second operation.

17. The method according to claim 13, wherein the predetermined condition is a completion of the second command.

18. The method according to claim 13, wherein
when the second command includes a write command, the predetermined condition is a reception of all write data associated with the write command.

* * * * *